US005742043A

United States Patent [19]
Knowles et al.

[11] Patent Number: 5,742,043
[45] Date of Patent: *Apr. 21, 1998

[54] BODY-NEARABLE LASER SCANNING SYSTEM WITH PROGRAMMED MODE FOR CONSECUTIVELY READING BAR CODE SYMBOLS WITHOUT SYSTEM REACTIVATION

[75] Inventors: Carl Harry Knowles, Moorestown; George B. Rockstein, Audubon; David M. Wilz, Sr., Sewell; David P. Bubnoski, Glassboro, all of N.J.

[73] Assignee: Metrologic Instruments, Inc., Blackwood, N.J.

[*] Notice: The term of this patent shall not extend beyond the expiration date of Pat. No. 5,260,553.

[21] Appl. No.: 651,235

[22] Filed: May 22, 1996

Related U.S. Application Data

[63] Continuation of Ser. No. 632,899, Apr. 16, 1996, which is a continuation of Ser. No. 489,305, Jun. 9, 1995, abandoned, which is a continuation of Ser. No. 821,917, Jan. 16, 1992, abandoned, which is a continuation-in-part of Ser. No. 583,421, Sep. 17, 1990, Pat. No. 5,260,553, and a continuation-in-part of Ser. No. 580,740, Sep. 11, 1990, abandoned.

[51] Int. Cl.⁶ ............................................. G06K 7/10
[52] U.S. Cl. ................................... 235/472; 235/462
[58] Field of Search ...................... 235/472, 462

[56] References Cited

U.S. PATENT DOCUMENTS

| | | |
|---|---|---|
| 3,911,270 | 10/1975 | Traub . |
| 3,978,317 | 8/1976 | Yamaguchi et al. . |
| 3,978,318 | 8/1976 | Romeo et al. . |
| 4,072,859 | 2/1978 | McWaters . |
| 4,086,476 | 4/1978 | King . |
| 4,136,821 | 1/1979 | Sugiura et al. . |
| 4,240,064 | 12/1980 | DevChoudhury . |
| 4,282,425 | 8/1981 | Chadima, Jr. et al. . |
| 4,387,297 | 6/1983 | Swartz et al. . |
| 4,409,470 | 10/1983 | Shepard et al. . |
| 4,431,912 | 2/1984 | Dickson et al. . |
| 4,460,120 | 7/1984 | Shepard et al. . |
| 4,496,831 | 1/1985 | Swartz et al. . |
| 4,521,678 | 6/1985 | Winter . |
| 4,570,057 | 2/1986 | Chadima, Jr. et al. . |
| 4,575,625 | 3/1986 | Knowles . |
| 4,603,262 | 7/1986 | Eastman et al. . |
| 4,639,606 | 1/1987 | Boles et al. . |
| 4,673,805 | 6/1987 | Shepard et al. . |
| 4,736,095 | 4/1988 | Shepard et al. . |
| 4,766,297 | 8/1988 | McMillan . |

(List continued on next page.)

FOREIGN PATENT DOCUMENTS

| | | |
|---|---|---|
| 0323848A3 | 1/1989 | Japan . |
| 0424097A1 | 4/1991 | Japan . |
| 0424976A2 | 5/1991 | Japan . |
| 0414452A1 | 2/1991 | United Kingdom . |

Primary Examiner—Donald T. Hajec
Assistant Examiner—Karl Frech
Attorney, Agent, or Firm—Hopgood, Calimafde Kalil & Judlowe

[57] ABSTRACT

A portable automatic code symbol reading system having a laser scanning engine mounted upon the hand of its operator to provide hands-free automatic laser scanning capabilities. The automatic code symbol reading system includes a battery power supply aboard its hand-mounted housing, and a power-conserving control subsystem for conserving the consumption of electrical power during automatic portable laser scanning operations. The control subsystem of the present invention has a plurality of control centers which control the operation of the system components in accordance with preselected system control operations. Each of the control centers is responsive to control activation signals generated by certain of the system components upon the occurrence of predefined conditions. Certain of the control centers are capable of overriding other control centers to provide diverse control capabilities. These control capabilities facilitate execution of intelligent functions and power consumption measures required during automatic, hands-free code symbol reading operations.

11 Claims, 12 Drawing Sheets

U.S. PATENT DOCUMENTS

| | | | |
|---|---|---|---|
| 4,766,299 | 8/1988 | Tierney et al. | 235/472 |
| 4,816,660 | 3/1989 | Swartz et al. | |
| 4,825,057 | 4/1989 | Swartz et al. | |
| 4,845,349 | 7/1989 | Cherry | |
| 4,877,949 | 10/1989 | Danielson et al. | |
| 4,897,532 | 1/1990 | Swartz et al. | |
| 4,930,848 | 6/1990 | Knowles | |
| 4,933,538 | 6/1990 | Heiman et al. | |
| 4,935,610 | 6/1990 | Wike, Jr. | |
| 4,958,894 | 9/1990 | Knowles | |
| 4,962,980 | 10/1990 | Knowles | |
| 4,970,379 | 11/1990 | Danstrom | |
| 5,015,833 | 5/1991 | Shepard et al. | |
| 5,017,765 | 5/1991 | Shepard et al. | |
| 5,059,777 | 10/1991 | Wittensoldner et al. | |
| 5,086,215 | 2/1992 | Carsner et al. | |
| 5,107,100 | 4/1992 | Shepard et al. | |
| 5,180,904 | 1/1993 | Shepard et al. | |
| 5,212,372 | 5/1993 | Quick et al. | 235/472 |
| 5,216,231 | 6/1993 | Ouchi | |
| 5,237,161 | 8/1993 | Grodevant | |
| 5,250,790 | 10/1993 | Melitsky et al. | |
| 5,260,553 | 11/1993 | Rockstein et al. | 235/472 |
| 5,262,627 | 11/1993 | Shepard | |
| 5,272,324 | 12/1993 | Blevins | 235/462 |
| 5,280,162 | 1/1994 | Marwin | |
| 5,340,971 | 8/1994 | Rockstein et al. | 235/472 |
| 5,340,973 | 8/1994 | Knowles et al. | 235/472 |
| 5,468,951 | 11/1995 | Knowles et al. | |

BODY-NEARABLE LASER SCANNING SYSTEM WITH PROGRAMMED MODE FOR CONSECUTIVELY READING BAR CODE SYMBOLS WITHOUT SYSTEM REACTIVATION

RELATED CASES

This is a continuation of application Ser. No. 08/632,899, filed Apr. 16, 1996 which is a continuation of application Ser. No. 08/489,305 filed Jun. 9, 1995 now abandoned, which is a continuation of application Ser. No. 08/821,917 filed Jan. 16, 1992, now abandoned, which is a continuation-in-part of application Ser. No. 07/583,421 filed Sep. 17, 1990, now U.S. Pat. No. 5,260,553, and application Ser. No. 07/580,740 filed Sep. 11, 1990 now abandoned.

BACKGROUND OF THE INVENTION

1. Field of Invention

This invention relates generally to laser-based bar code symbol reading systems, and more particularly to an automatic bar code symbol reading system having a compact lightweight, laser scanning engine arrangable for mounting on the body of the user for hands-free scanning applications.

2. Brief Description of the Prior Art

Various types of laser scanning devices are in use and have been disclosed in the patent literature. Many of these scanners read bar codes, such as the Uniform Product Code (UPC), which are imprinted on products, labels affixed to products, or packaging for products.

One type of scanner is referred to as a slot scanner. Typically slot scanners are mounted beneath or at the checkout counter of a retail establishment, such as a supermarket. Another type of scanner is a hand-held scanner. This type of scanner typically includes a grip portion held in one's hand to enable the scanner to be directed onto a bar code so that the scan pattern produced by the scanner traverses the bar code symbol in order to read it.

In the last few years there has been increased development toward making hand-held scanners extremely small and lightweight. One such scanner is disclosed in my United States Letters Patent No. 4,930,848, whose disclosure is incorporated by reference, and which is assigned to the same Assignee as this invention. That scanner comprises a hand grip portion and a body portion. Within the body portion of the scanner is an "laser scanning engine" having all of the necessary optical, mechanical and electrical components required to produce a laser beam scanning pattern for reading bar codes and for receiving light reflected therefrom to produce an electrical signal indicative thereof. Other hand-held laser scanners are disclosed in the patent literature, including U.S. Pat. Nos. 4,387,297 (Swartz, et al.), 4,409,470 (Swartz, et al.), 4,460,120 (Swartz, etal.), 4,607,156 (Koppenall, etal.), 4,706,248 (Swartz, etal.), and 4,575,625 (Knowles).

Although prior art hand-held scanners are capable of reading bar code symbols, they all typically require that they be held in the hand of the user so that the laser beam scanning pattern can be aimed at the bar code symbol. In the course of checking out customers' purchases at a checkout counter, a clerk is thus required to continually pick up the scanner, direct its laser beam onto the symbols to effect the reading of the symbols, and then either lay down the scanner between readings or between customers or place it in a support cradle or mount so that the clerk can use his or her hands for other purposes.

Thus, there is a great need in the art for a bar code symbol reading system that offers the features of a hand-held system, while enabling hands-free triggerless operation.

OBJECTS OF THE INVENTION

Accordingly, a general object of the present invention is to provide an automatic bar code symbol reading system having a laser scanning engine of compact, lightweight construction, and which overcomes the disadvantages of prior art systems.

It is a further object of the present invention to provide a compact, lightweight bar code symbol reading system which allows the hands of the user to be free when the scanner is in use.

It is still a further object of this invention to provide a compact, lightweight bar code symbol reading system having a small laser scanning engine mountable to the body of the user for producing a laser scanning pattern during hands-free operation.

It is still a further object of this invention to provide a compact, lightweight bar code symbol reading system having a body mounted laser scanning engine which is connected to a processing unit which may be mounted on the body of the user or on some other structure.

It is still another further object of this invention to provide a compact, lightweight bar code symbol reading system which is body-mountable and which automatically initiates operation of the laser scanner engine when the laser scanner engine is brought close to an object with a coded symbol to be read.

SUMMARY OF THE INVENTION

These and other objects of the subject invention are achieved by providing an automatic bar code symbol reading system for reading coded symbols, e.g., UPC symbols, etc.

In the illustrative embodiment, the system comprises a laser scanning engine for producing a laser scanning pattern and a remote unit coupled thereto. The laser scanning engine having a compact lightweight construction, includes means for mounting the same on the body of the user, e.g., on the wrist, head, etc. The user may conveniently position the laser scanning engine on his or her body so that the laser scanning pattern produced thereby is directed toward and traverses the coded symbol to be read. The laser scanning engine is operably connected to the remote unit by way of conducting means. In the illustrative embodiment, the remote unit includes electrical means for processing and decoding the signals received from the laser scanning engine and producing symbol character data representative of the symbols read. The remote unit may be also mounted on the body of the user or on some stationary support.

BRIEF DESCRIPTION OF THE DRAWINGS

The objects and advantages of the present invention will be readily appreciated by reading the following Detailed Description of the Illustrated Embodiment in conjunction with the accompanying drawings, wherein.

DETAILED DESCRIPTION OF THE ILLUSTRATIVE EMBODIMENT

Figure 1:
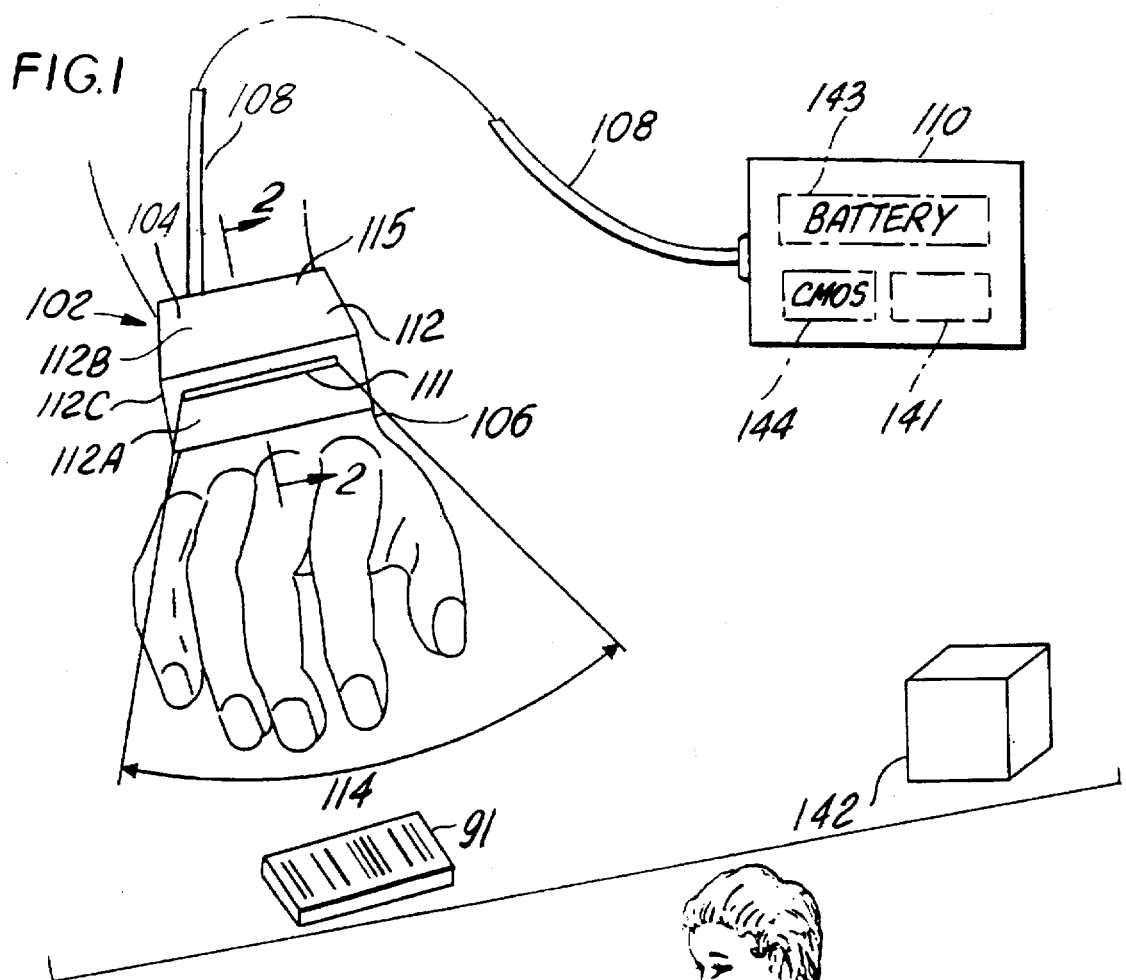
FIG. 1 is a perspective view of an automatic portable bar code symbol reading system constructed in accordance with the present invention and comprising a laser scanning engine shown mounted on a wrist of a user and with a remote unit connected thereto by way of a cable.

Referring now in greater detail to the drawings, where like characters refer to like parts, the laser-based bar code symbol reading system of the present invention is shown in FIG. 1.

As illustrated, bar code symbol reading system 102 comprises a laser scanning engine 104 and a remote unit 110 connected together by way of a cable 108. The laser scanning engine 104 is preferably constructed in accordance with the teachings set forth in aforementioned U.S. Pat. No. 4,930,848 and in co-pending U.S. Patent application Ser. No. 299,988, filed on Jan. 23, 1989, entitled Laser Scanner Engine with Folded Beam Path, and in co-pending U.S. Pat. application Ser. No. 07/300,018, filed Jan. 23, 1989, entitled Bouncing Oscillating Scanning Device for Laser Scanning Apparatus, all of which are assigned to the same Assignee of this invention, and whose disclosures are incorporated herein by reference.

The laser scanning engine disclosed in application Ser. No. 07/299,988 is an extremely compact and lightweight device. That device includes beam sweeping means, constructed in accordance with the teachings set forth in co-pending application Ser. No. 07/300,018, for sweeping for laser beam through an arc to form a linear single line scanning pattern. The laser scanning engine is contained within a housing 112 which also includes various optical components for folding and forming laser beam path downstream of the beam sweeping means so as to increase the focal length of the beam, and thereby allow for a smaller beam scan angle then otherwise possible with such a compact housing. Thus features enable accurate and reliable reading of coded symbols located close to and substantially far away from the laser scanning engine 104. The beam sweeping means includes an oscillating mirror system constructed in such a manner so that the speed of oscillations is substantially linear between reversals instead of the sinusoidal speed variation exhibited by prior art oscillating mirror devices.

As shown in FIG. 1, the laser scanning engine 104 is arranged for convenient mounting on a portion of the body of the user, e.g., on the wrist of a user by way of a strap 106. The cable 108 serves to carry the electrical signal produced by the laser scanning engine (and which is representative of the bar code) to the remote unit 110 where the signal is processed, e.g., decoded. Electrical power for the laser scanning engine is also provided from the remote unit 110 by way of cable 108.

Figure 2:
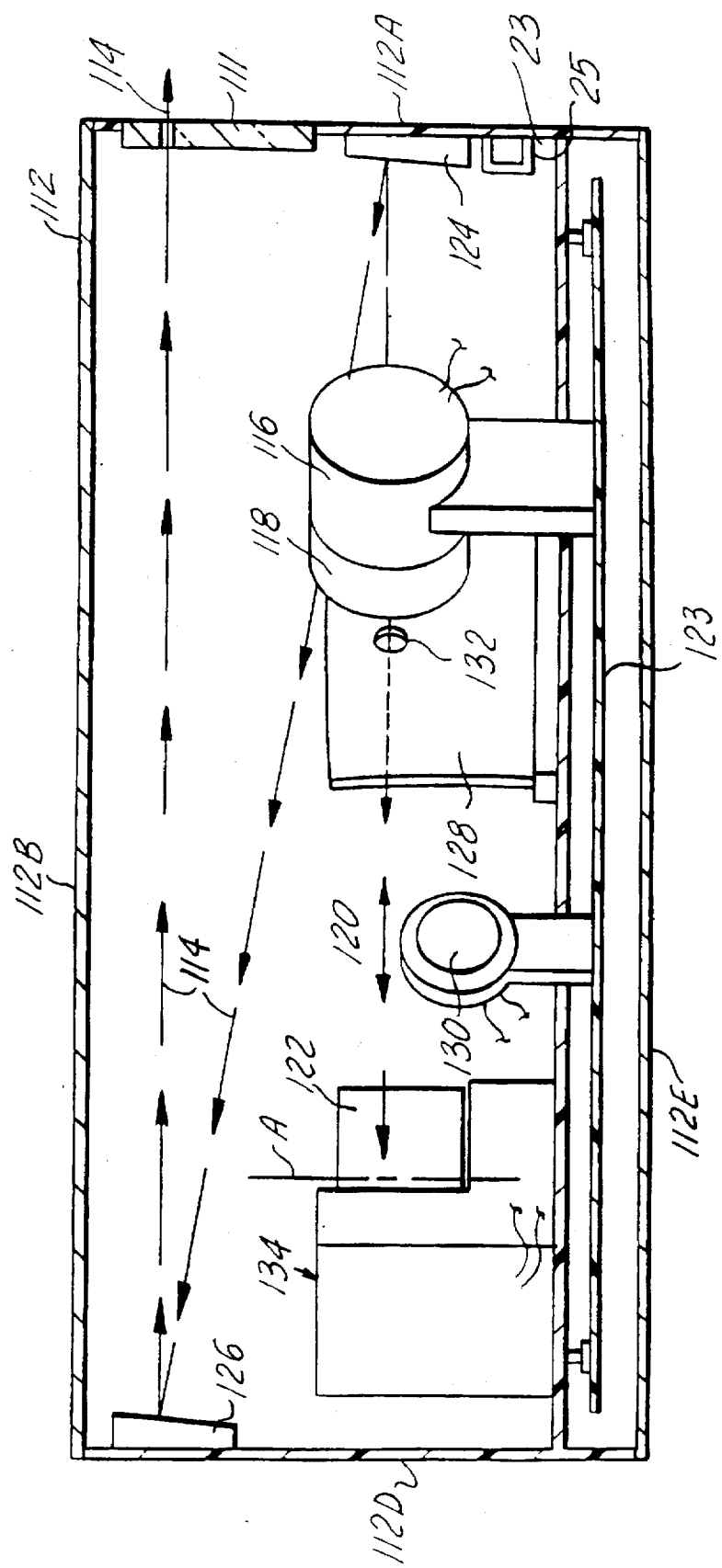
FIG. 2 is an enlarged sectional view of the laser scanner engine taken along with line 2—2 of FIG. 1.

As shown in FIG. 2, the laser scanning engine 104 includes a semi-conductor laser diode 116 with an associated focusing means 118 for producing a focused laser light beam 120. The laser light beam 120 is projected within the housing 112 of the laser scanning engine onto a beam sweeping mechanism 134 (constructed in accordance with the teachings set forth in patent application Ser. No. 07/300,018). The beam sweeping mechanism includes a planar mirror 122 which is oscillated back and forth to sweep the laser beam 120 through an arc to thereby create the laser scan line 114 when projected onto a surface. The line is ultimately projected out of the window 111 of the engine for traversing the bar code symbol to be read.

In order to fold the swept laser beam within the housing downstream of the beam sweeping means, i.e., between the beam sweeping means and window 111, the laser scanning engine also includes the beam folding means constructed in accordance with the teachings set forth in application Ser. No. 299,988. Thus, as can be seen, the laser beam is first directed from the scanning or oscillating mirror 122 onto a stationary mirror 124 mounted on the front end wall 112A of the housing 112. The stationary mirror 124 reflects the beam upward to a mirror 126 fixedly mounted on the rear end wall 12D of the housing. The mirror 126 is angled slightly downward so that the reflected beam is directed generally horizontally within the housing out through the window 111 in the front end wall 112A to create a linear scan line 114 when projected on a planar surface, e.g., a surface bearing a bar code.

The light reflected back from the bar code passes through the window 111 where it is received by mirror 126 and reflected back to mirror 124 and from there to the oscillating mirror 122. The oscillating mirror reflects the received light back to a fixed collecting mirror 128. The fixed collecting mirror 128 includes a spherical concave surface for focusing received light onto a phototransistor 130. The phototransistor 130 converts the reflected light into an electrical signal indicative thereof and provides that signal by way of cable 108 to the remote unit 110.

As the laser scanning engine of the illustrative embodiment operates according to retroflective design principles, with its collecting mirror 128 located between the laser diode 116 and the scanning mirror 122, it therefore includes an opening or hole 132 in collecting mirror 128 in order to enable the outgoing laser beam to pass therethrough to the beam sweeping (oscillating) mirror 122.

Figure 3:
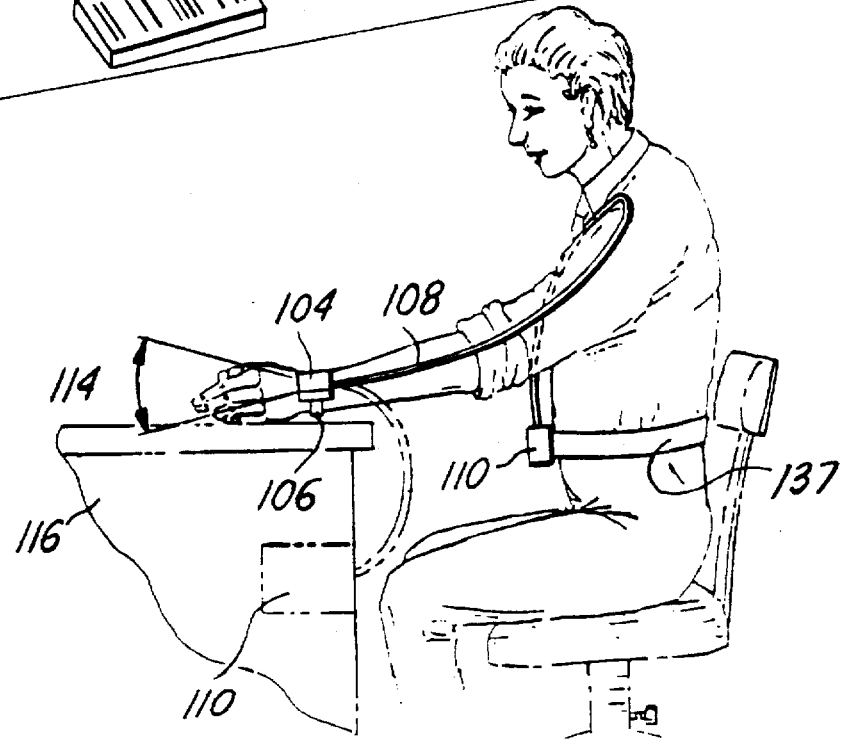
FIG. 3 is a side elevational view of one typical use of the system of the present invention, namely, a user seated at a counter with the laser scanning engine mounted on the user's wrist while the remote unit is mounted either on the user's body or alternatively at the counter.

In FIG. 3, the bar code symbol reading system is shown arranged for use in one typical application. In this application, the system is worn by a clerk or other person at a checkout counter of a store, at a checkout counter of a library, or some other venue. In particular, the laser scanning engine 104 is mounted on the wrist of the clerk by way of strap 106. In order to scan a bar code symbol, all that is necessary is for the clerk to hold up his or her arm with the laser scanner engine supported thereon so that the light transmission window 111 of the laser scanning engine is directed toward the bar code symbol, whereupon the laser beam pattern 114 is projected onto the bar code symbol to be read. This action leaves the operator's hands free for other purposes. The laser light reflected back from the bar code symbol passes through light transmission window 111, through the beam folding optics, the oscillating mirror and the collecting mirror to the phototransistor which converts the received light into an electrical signal indicative of the scanned bar code symbol. The produced electrical signal is provided by way of cable 108 to the remote unit 110 for processing in a conventional manner.

As shown in FIG. 3, the remote unit 110 comprises a housing in which its operational components, e.g., circuit boards, power supply, etc., are located. The remote unit 110 may be worn on a belt 137 or disposed in a holster (not shown) located on the waist of the user. Alternatively, the remote unit 110 may be mounted at the counter 116 itself. This alternative embodiment is shown by the phantom lines drawn in FIG. 3.

In general, remote unit 110 employs components and performs functions which are well known in the bar code symbol reading art. In the illustrative embodiment, remote unit 110 includes signal processing and decoding circuitry for processing the electrical signal received from the laser scanning engine into an electrical signal containing the information of the coded symbol (i.e., symbol character data). This signal may be stored in the remote unit for later retrieval, or may be passed on to some piece of peripheral equipment 142, such as a cash register, a computer, or any other terminal by way of any suitable means (not shown), e.g., an RS232 port. As shown in FIG. 3, remote unit 110 may also include an RF transceiver 141 for transmitting the processed electrical signal, e.g., symbol character data associated with the decoded symbol, to peripheral equipment such as a host computer, or data collection device 142.

Inasmuch as the bar code symbol reading system of FIGS. 1 and 3 is completely portable, the remote unit 110 also includes a power supply, e.g., a battery 143, for supplying electrical power to the laser scanning engine 104 by way of the cable 108.

It should by noted that no trigger or other hand operated device is required to activate or deactivate the automatic bar code symbol reading system of the present invention. An energy transmitter and receiver and associated circuitry of the kind disclosed in U.S. patent application Ser. No. 07/583,421 for a "Method and Apparatus for Automatically Reading Bar Code Symbols", filed on Sept. 17, 1990, now U.S. Pat. No. 5,260,553 and whose disclosure is incorporated herein, may be used to automatically activate the automatic bar code symbol reading system hereof. This aspect of the present invention is best appreciated with reference to the system of FIGS. 4 to 11, described below.

Figure 4:
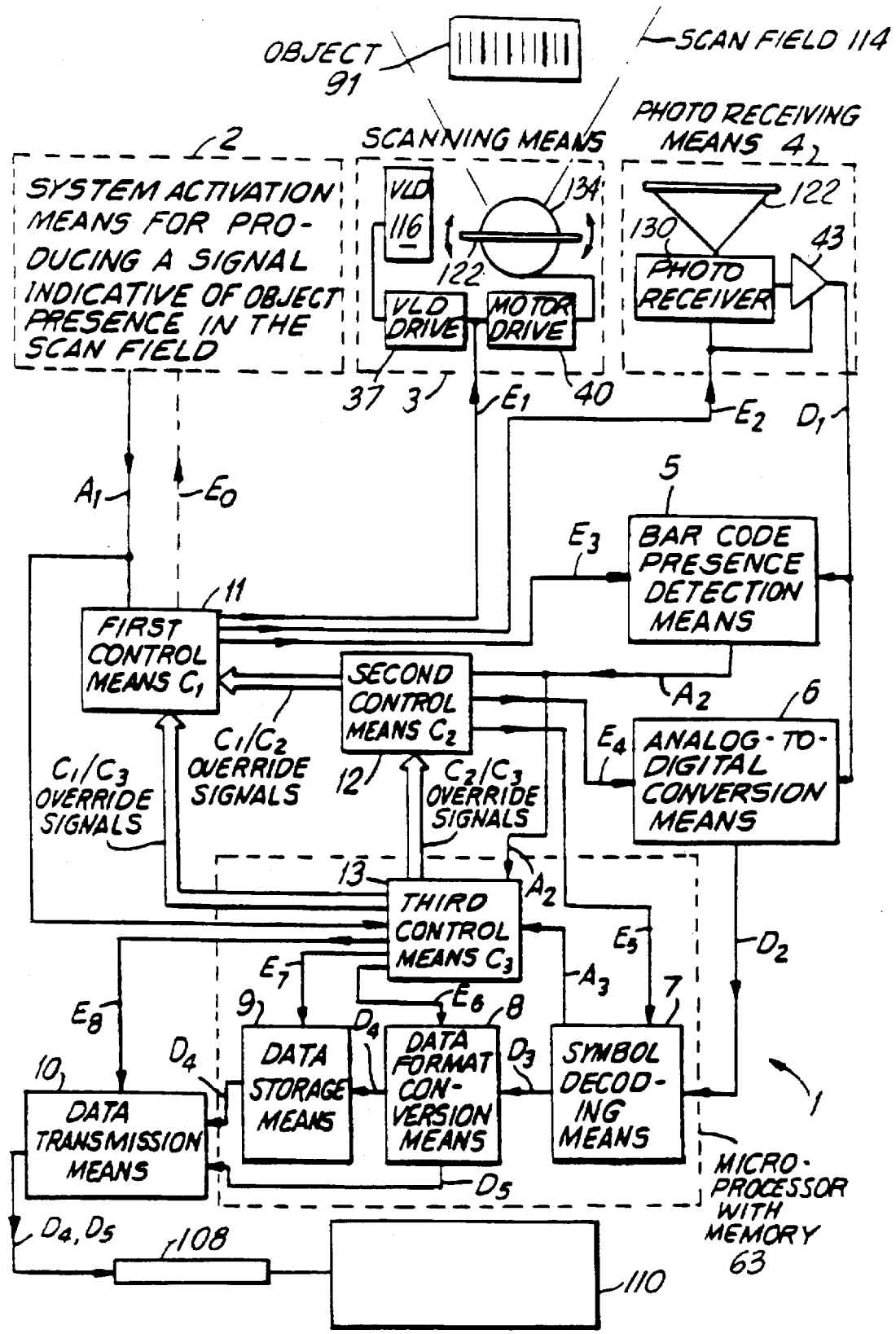
FIG. 4 is a block functional system diagram of the automatic bar code symbol reading system of the present invention, illustrating the principal components of the system integrated within the control system thereof.

As shown in FIG. 4, bar code symbol reading system 102 comprises a number of system components, namely, system activation means 2, scanning means 3 (e.g., mirror 122 and motor 134), photoreceiving means 4 (e.g., collecting mirror 122 and photoreceiver 130), bar code presence detection means 5, analog-to-digital (A/D) conversion means 6, symbol decoding means 7, data format conversion means 8, symbol character data storage means 9, and data transmission means 10. As illustrated in FIG. 4, these system components are embedded within a programmable control system having a unique architecture which provides a great degree of versatility in system capability and operation, as well as power conservation. The structure, function and advantages of this control system architecture will be described in great detail hereinafter.

The control system of the present invention comprises essentially three major components, namely first control means ($C_1$) 11, second control means ($C_2$) 12, and third control means ($C_3$) 13. As will be described in greater detail hereinafter, second control means 12 is capable of "overriding" (i.e., exhibit and/or enable) first control means 11, whereas third control means 13 is capable of overriding second control means 12 and first control means 11. As shown in FIG. 4, such control override functions are carried out by the generation of control override signals (i.e., $C_1/C_2$, $C_1/C_3$, and $C_2/C_3$) transmitted between respective control structures.

As illustrated in FIG. 1, battery power supply 143 in remote unit 110 provides the requisite electrical power to each of the system components of FIG. 4, when and for time prescribed by the control system hereof. Typically, an on/off power switch or functionally equivalent device will be provided external to housing 112 to permit the user to empower the automatic bar code symbol reading system. When power switch is initially engaged to its ON position, power will only be provided to system activation means 2 to enable its operation, while, for example, only biasing voltages and the like are provided to all other system components so that they are each initially disabled from operation.

Figure 5A:
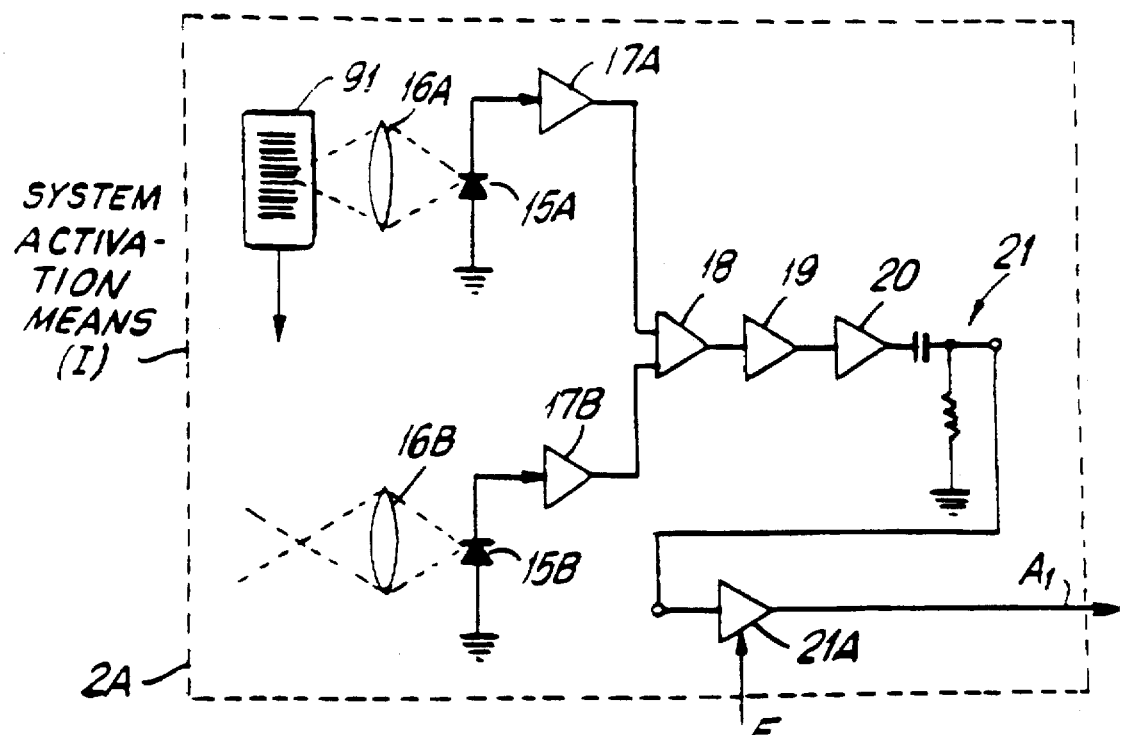
FIG. 5A is a block functional diagram of a first embodiment of the system activation means of the automatic bar code symbol reading system of the present invention.
Figure 5B:
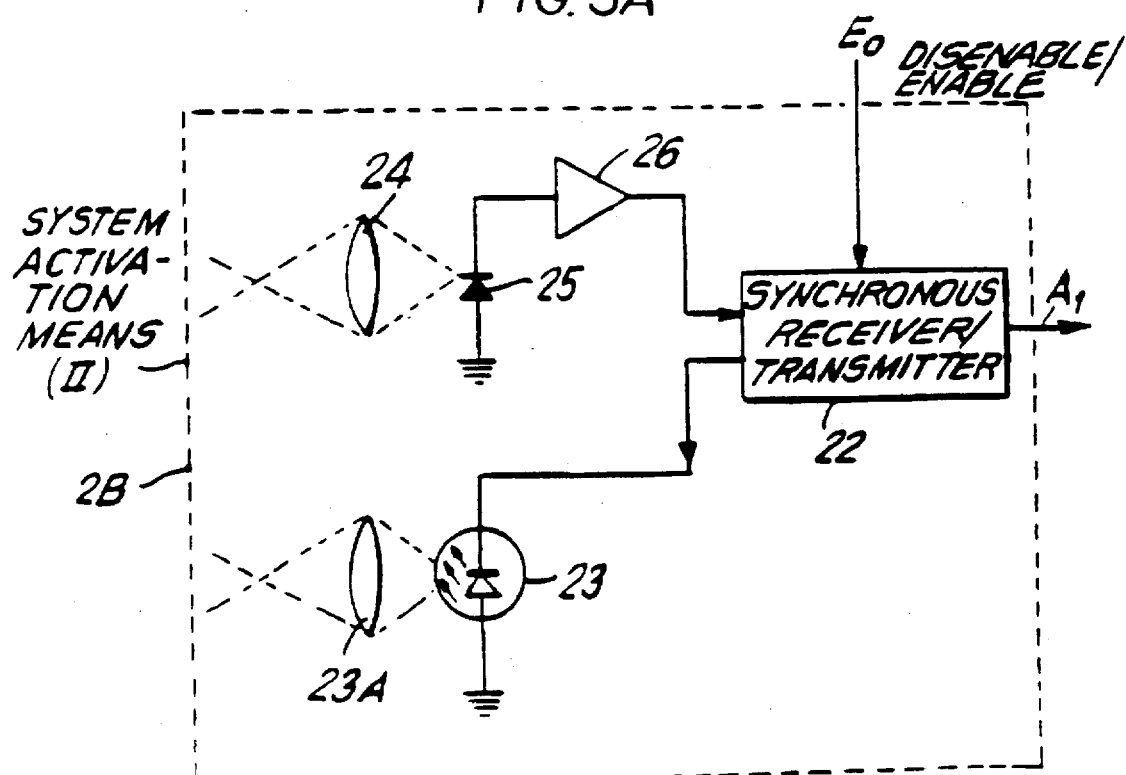
FIG. 5B is a block functional diagram of a second embodiment of the system activation means of the automatic bar code symbol reading system of the present invention.

FIG. 5 is a logical function diagram of the first control means of the control system of the present invention;

In accordance with the present invention, the purpose of system activation means 2 is to produce first control activation signal $A_2$ upon determining (i.e., detecting) the presence of an object (e.g., product, document, etc.) within the scan field of bar code symbol reading device 1. In turn, first control activation signal $A_1$ is provided as input to both first and third control means 11 and 13, respectively. In FIGS. 5A and 5B, two different approaches to generating first control activation signal $A_1$ are disclosed.

In FIG. 5A, a passive technique is illustrated, in which passive detection of ambient light within the scan field is performed in order to determine if an object is present within the scan field 114 of the automatic bar code symbol reading system 1. As illustrated in FIG. 5A, passive ambient light detection circuit 2A comprises a pair of photo diodes 15A and 15B, which sense ambient light gathered from two different parts of the scan field in front of the light transmission window 111 of housing 112, using focusing lenses 16A and 16B, respectively. The output signals of photodiodes 15A and 15B are converted to voltages by current-to-voltage amplifiers 17A and 17B respectively, and are provided as input to a differential amplifier 18. The output of differential amplifier 18 is provided as input to a sample and hold amplifier 19 in order to reject 60 and 120 Hz noise. Output signal of amplifier 19 is provided as input to a logarithmic amplifier 20 to command signal swing. The output signal of logarithmic amplifier 20 is provided as input to a differentiator 21 and then to a comparator 21. The output of comparator 21 provides first control activation signal $A_1$ In FIG. 5B, an active technique is illustrated in which an infrared signal is transmitted out into the scan field and first control activation signal $A_I$ is generated upon receiving a reflection of the transmitted signal off an object within the scan field. As illustrated in FIG. 5B, infrared object detection circuit 2B comprises a synchronous receiver/transmitter 22, which includes an infrared LED 23 which generates a 900 nanometer pulsed signal at a rate of 2.0 KHZ. This pulsed signal is transmitted through focusing lens 23 to illuminate the scan field. When an object is present within the scan field, a reflected pulse signal is produced and focused through focusing lens 24 onto photodiode 25. The output of photodiode is converted to a voltage by current-to-voltage amplifier 26, and the output thereof is provided as input to receiver/transmitter 22, to synchronously compare the received signal with the transmitted signal and determine if an object is present in the scan field. If so, then synchronous receiver/transmitter 22 produces first control activation signal $A_1=1$ indicative of such condition. First control activation signal $A_1=1$, upon being generated, activates first control means 11 which, in turn, enables operation of scanning means 3, photoreceiving means 4, and bar code presence detection means 5, as will be described in greater detail hereinafter. In order to conserve power and improve signal-to-noise ratio at photoreceiving means 4 during scan data collection operations, it is preferable for first control means 11 to generate and provide a disable signal $E_O$ to infrared object detection circuit 2B whenever first control means 11 enables the scanning means 3.

Figure 7:
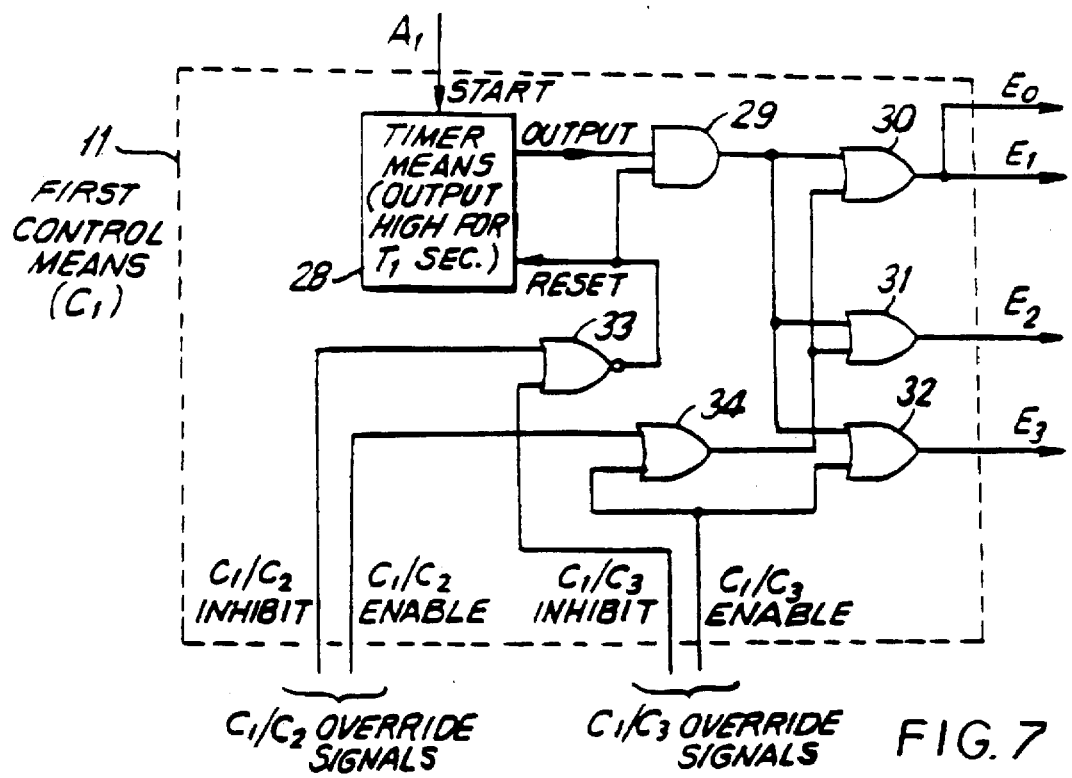
FIG. 7 is a logical functional diagram of the first control means of the control system of the present invention.

As illustrated in FIGS. 4 and 7, first control means 11 is preferably realized by a circuit capable of generating enabling signals $E_1$, $E_2$ and $E_3$ for the scanning means, photoreceiving means and bar code presence detection means, respectively. As will be described in detail hereinafter, the specific operation of first control means 11 is dependent on the state of three sets of input signals, namely, first control activation signal A, $C_I$ override signals from $C_2$ (i.e., $C_1/C_2$ inhibit signal and $C_1/C_2$ enable signal), and $C_I$ override signals from $C_3$ (i.e., $C_1/C_3$ inhibit signal and $C_1/C_2$ enable signal). As shown, first control activation control signal $A_1$ is provided to the "START" input of timer 28 upon which it produces a "high" output signal for a first predetermined time period (i.e., $T_1$ seconds). Preferably, time period $T_1$ is selected to be about 0.3 seconds.

As illustrated in FIG. 7, the output signal of timer 28 is provided as an input to AND gate 29, with its other input connected to the RESET input of timer 28. The output of AND gate 29 is provided as an input to each of OR gates 30, 31 and 32. The $C_I/C_2$ inhibit signal from second control means 12 and the $C_1/C_3$ inhibit signal from third control means 13 are provided as inputs to NOR gate 33, whereas $C_1/C_2$ enable signal from second control means 12 and the $C_1/C_3$ enable signal from third control means 13 are provided as inputs to OR gate 34. As shown, the output signal of OR gate 34 is provided to the other input of OR gates 30 and 31, whereas the output signal from NOR gate 33 is provided as input to AND gate 29. The $C_1/C_3$ enable signal is also provided as input to OR gate 32, to complete the description of the circuit realization of first control means 11. As indicated in FIG. 7, the outputs of OR gates 30, 31 and 32 provide enable signals $E_1$, $E_2$ and $E_3$ for the scanning means, photoreceiving means and bar code presence detection means, respectively. Notably, disable signal $E_O$ is produced from the output of OR gate 30.

As illustrated in FIGS. 2 and 4, scanning means 3 comprises a light source 116 which, in general, may be any source of intense light suitably selected for maximizing the reflectively from the object. In the preferred embodiment, light source 116 comprises a solid-state visible laser diode (VLD) which is driven by a conventional driver circuit 37. As shown in FIGS. 2 and 4, the laser beam output from laser diode 116 is swept over scan field 114 (having a predetermined spatial extent in front of front portion of housing 112), by scanning mirror 122 being oscillated back and forth by stepper motor 134 in response to being driven by a conventional driver circuit 40, as shown. To selectively activate both laser light source 116 and motor 134, the scanning means enable signal $E_1$ is provided as an input to both driver circuits 37 and 40. When enable signal $E_1$ is a logical "high" level (i.e., $E_1$ =1), scanning means 3 is operable, a laser beam is generated and scanned across the scan field, and scan data is thereby produced off any object residing within the scan field.

In a conventional manner, when an object, such as product bearing a bar code symbol, is within the scan field at the time of scanning, the laser beam incident thereon will be reflected, producing a laser light return signal of variable intensity which represents a spatial variation of light reflectivity characteristic of the spaced apart pattern of bars comprising the bar code symbol. Photoreceiving means 4 is provided for the purpose of detecting at least a portion of laser light of variable intensity, which is reflected off the object and bar code symbol within the scan field. Upon such detection, photoreceiver 130 produces an analog data signal $D_1$ indicative of the detected light intensity. In general, scan data collection optics, namely focusing mirrors 122, 124, 126, and 128, focus scan data signals for subsequent detection by photoreceiver 130. Photoreceiver 130, in turn, produces an analog signal indicative of the intensity of the scan data signal, which is subsequently amplified by preamplifier 43 to produce analog scan data signal $D_1$. In combination, scanning means 3 and photoreceiving means 4 operate to generate scan data from the scan field, over time intervals specified by first control means 11 during normal (i.e., noncontrol-override) modes of operation, and by third control means 13 during "control override" modes of operation. As will illustrated hereinafter, this scan data is used by both bar code presence detection means 5 and symbol decoding means 6.

As illustrated in FIG. 4, analog scan data signal $D_1$ is provided as input to both bar code presence detection means 5 as well as A/D conversion means 6. The primary purpose of bar code presence detection means 5 is to determine whether a bar code is present in or absent from the scan field, over time intervals specified by first control means 11 during normal modes of operation and by third control means 13 during control override modes of operation. When the presence of a bar code symbol in the scan field is determined, the bar code presence detection means 5 generates second control activation signal $A_2$ (i.e., $A_2=1$) which is provided as input to second control means 12, as shown in FIG. 4.

Figure 6:
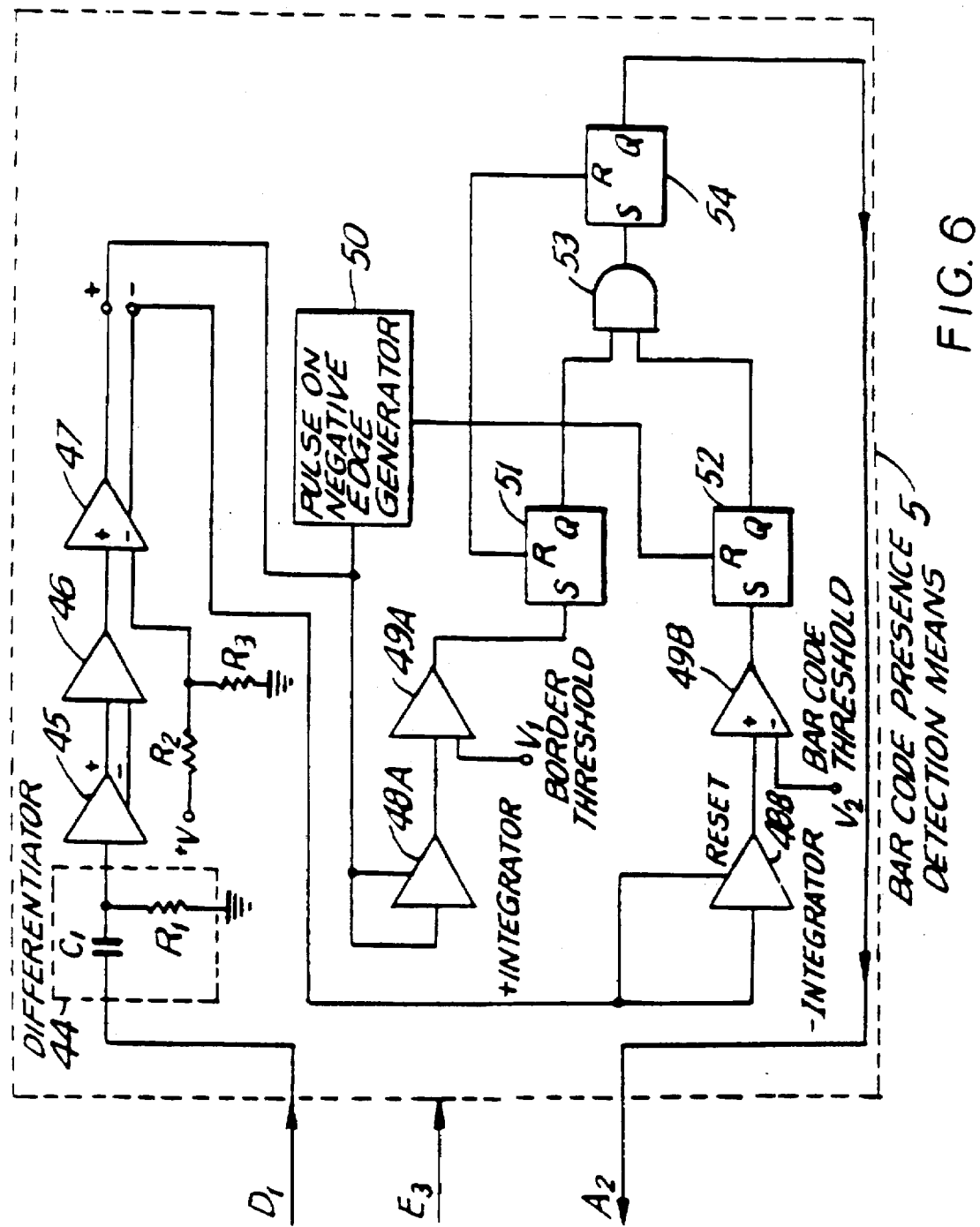
FIG. 6 is a block functional diagram of the bar code presence detection means of the automatic bar code symbol reading system of the present invention.

As illustrated in FIG. 6, bar code presence detection means 5 is provided with enable signal $E_3$ which is used to enable circuitry employed in the realization of the bar code presence detection means. In the preferred embodiment, bar code presence detection means 5 is realized as a bar code envelope detector circuit which processes analog scan data signal $D_1$ so as to produce a signal, the intensity of which indicates the general envelope of a bar code within the scan field. Upon such detection, bar code envelope detection circuit 5 produces second control activation signal $A_2=1$ which is provided as input to second control means 12.

As shown in FIG. 6, analog scan data signal $D_1$ is provided as input to a differentiator 44 comprising capacitance element $C_1$ and resistive element $R_1$, to produce the first derivative signal of signal $D_1$. The first derivative signal is then amplified by a differential output amplifier 45, to produce as output amplified positive and negative first derivative signals, which in turn are provided as input to a positive peak detector 46. The output signal of positive peak detector 46 is provided as input to a comparitor 47 which generates positive and negative bar cede detect (BCD) signals.

As illustrated in FIG. 6, the positive and negative BCD signals are then provided as input and RESET signals to both integrators 48A and 48B. Positive BCD signal is also provided as input to pulse generator 50, which generates pulses upon the detection of the negative edges of the positive BCD signal. As shown, the output signals of intergrators 48A and 48B are provided as first inputs to comparitors 49A and 49B respectively, whereas an envelope border threshold voltage $V_1$ and bar code threshold voltage $V_1$ are provided as second inputs to comparitors 49A and 49B, respectively. Boarder voltage $V_1$ is a DC reference voltage whose value can be determined on the basis of the time constant of intergrater 48A, its gain, and the time duration of the minimum required "boarder width" of the bar code symbol. Bar code threshold $V_2$ is also a DC reference voltage whose value can be determined on the basis of the time constant of intergrater 48B, its gain, and the time duration of the minimum required "bar code length".

The output of comparitors 49A and 49B are provided to the "S" gates of latches 51 and 52, respectively, and the "Q" gates of these latches are provided as inputs to AND gate 53, as shown in FIG. 6. The output of AND gate 53 is provided as input to the "S" gate of latch 54, whereas the "R" gate of latch 54 is connected to the "R" gate of latch 51. The output of pulse generator 50 is provided as input to the "R" gate of latch 52. The output of latch 54 provides second control activation signal $A_2$, which in turn, is provided as input to second control means 12, as shown in FIG. 4. The operation of the bar code envelope detector 5 is essentially as follows. If the output signals of both comparitors 49A and 49B go "high" before the next RESET pulse from pulse generator 50 is provided to latch 52, then the output of latch 54 will go "high" (i.e., $A_2=1$) indicating that a bar code is present in the scan field.

In general, when the presence of a bar code in the scan field is detected, second activation control signal $A_2$ is generated, second control means 12 is activated and first control means 11 is overridden by second control means 12 through the transmission of control override signals (i.e., $C_1/C_2$ inhibit and $C_1/C_2$ enable signals) from the second control means.

Figure 8:
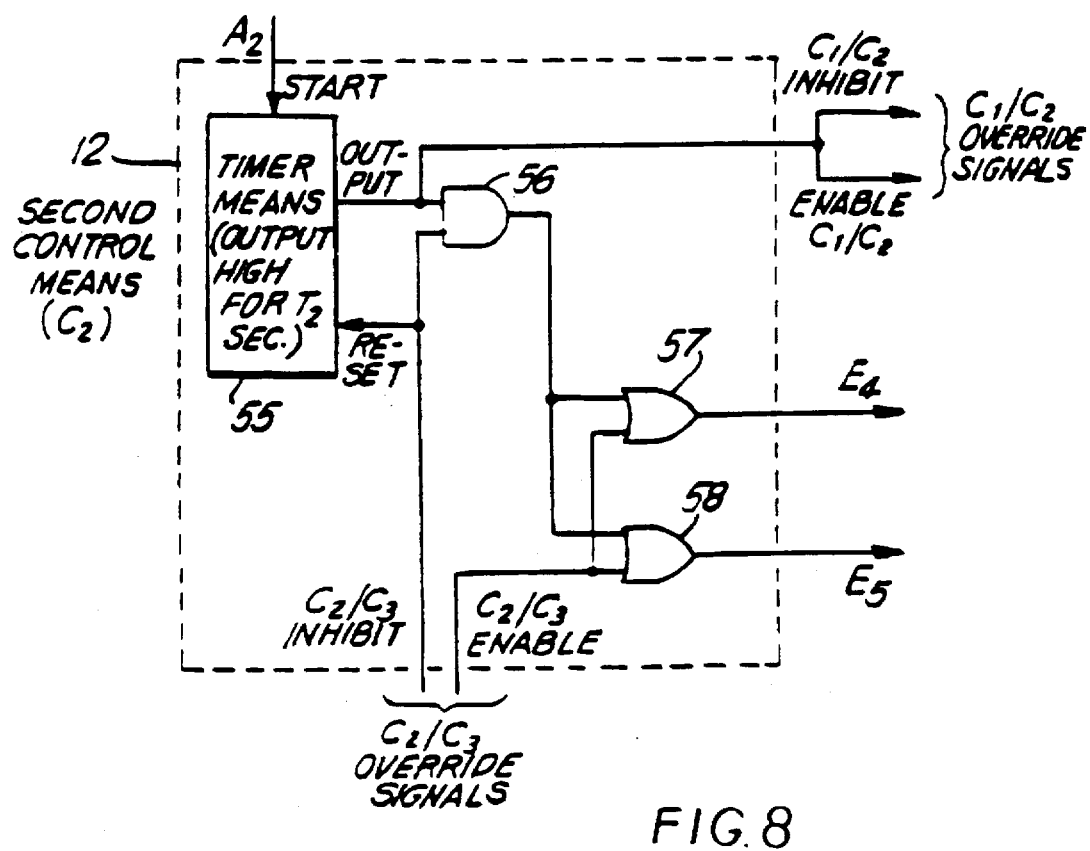
FIG. 8 is a logical function diagram of the second control means of the control system of the present invention.

As illustrated in FIG. 8, second control means 12 preferably includes a timing means 55 whose output signal remains high for a second predetermined time period $T_2$. Preferably, time period $T_2$ is selected to be about 1.0 seconds. Second control activation signal $A_2$ is provided to the start input of timing means 55, while the output thereof is provided as an input to AND gate 56, as shown. Third control means 13 provides a pair of $C_2$ override signals (i.e., $C_2/C_3$ A and $C_2/_3$B), as input to second control means 12, as shown in FIG. 4. The $C_2/C_3$ inhibit signal is provided to the second input of timing means 55. The $C_2/C_3$ enable signal, on the other hand, is provided to the first input of OR gates 57 and 58, whereas the output of AND gate 56 is provided as second input to each of OR gates 57 and 58. As illustrated in FIG. 8, the output signal of timing means provides both $C_1/C_2$ inhibit and $C_1/C_2$ enable signals, whereas the output of OR gates 57 and 58 provides enable signals $E_4$ and $E_5$ for enabling A/D conversion means 6 and symbol decoding means 7, respectively.

Upon detecting the presence of a bar code symbol in the scan field, second control activation signal $A_4$ activates second control activation means 12, which, in turn, directly enables A/D conversion means 6 and symbol decoding means 7 by enabling signals $E_4$ and $E_5$, respectively. Indirectly, second control means 12 enables scanning means 3 and photoreceiving means 4 and disables bar code presence detection circuit 5 by providing $C_1$ override signals to first control means 11.

A/D conversion means 6 can be realized by any conventional A/D circuit or chip known in the bar code symbol reading unit, and functions to convert analog scan data signal D into a digital scan data signal $D_2$, corresponding to the detected intensity of laser light collected and detected at photoreceiving means 4. The digitized scan data signal $D_2$ is provided as input to symbol decoding means 7, which scan line by scan line, decodes processes in a conventional manner, the stream of digitized scan data. The decoding means 7 processes a scan line of the digital scan data at a time, in an attempt to decode a valid bar code symbol within the second predetermined time period $T_2$ established and monitored by timing means 55 of second control means 12. If decoding means 7 successfully decodes a bar code symbol within time period $T_2$, then symbol character data $D_3$ (typically in ASCII code format) is produced corresponding to the decoded bar code symbol. Thereupon third control activation signal $A_3$ is produced by symbol decoding means 7 and is provided to third control means 13 to activate the same. In response, third control means 13 provides override control signals to first control 11 and second control means 12, as described hereinabove.

Figure 9A:
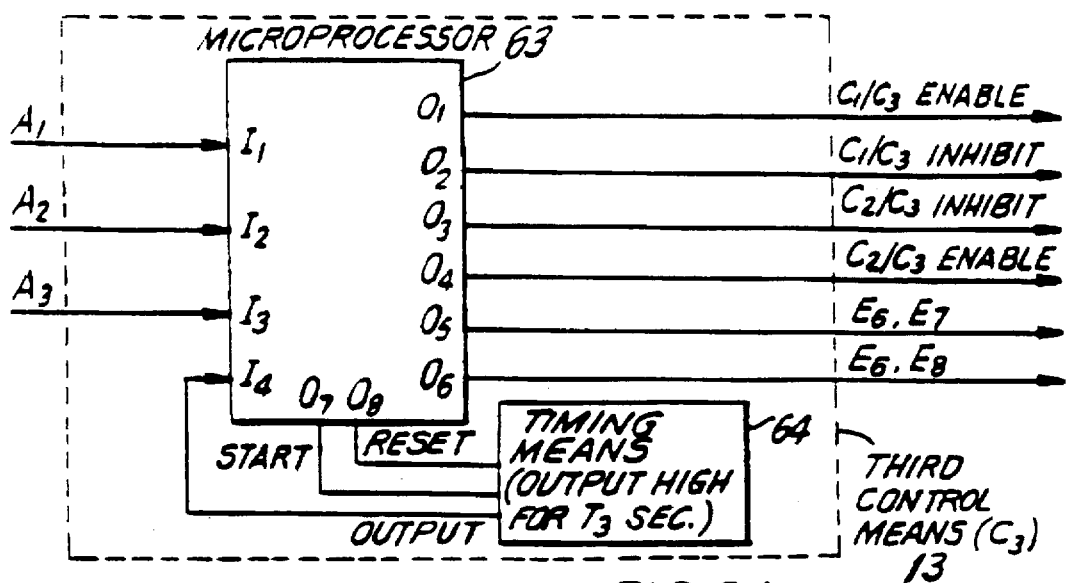
FIG. 9A is a functional block diagram of the third control means of the control system of the present invention.
Figure 9B:
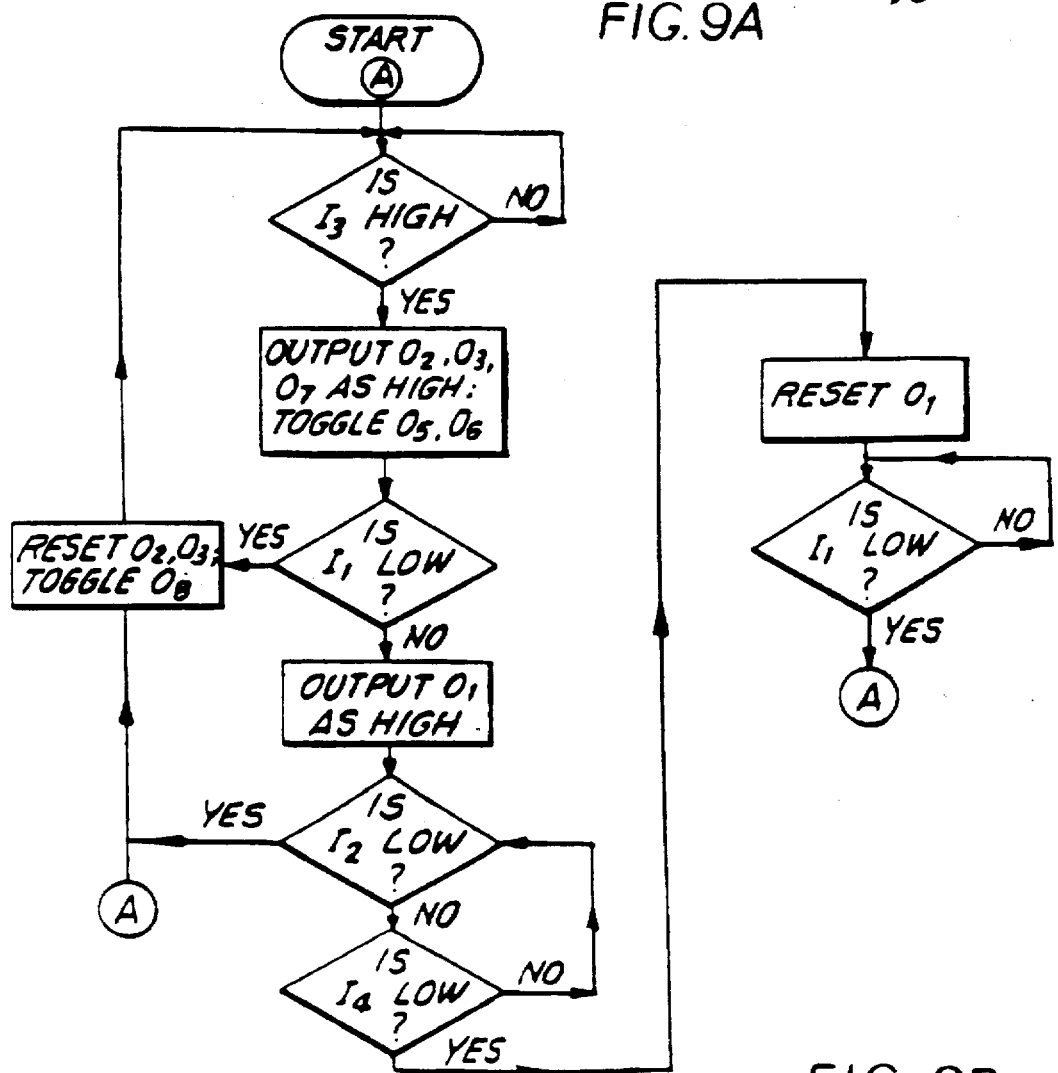
FIG. 9B is a flow chart of a control program carried out in the third control means for the case of system-control operation No. 2 (i.e., path option 2) of the illustrative embodiment.

As illustrated in FIGS. 4, 9A and 9B, third control means 13 of the illustrated embodiment generates and provides enable signals $F_6$, $E_7$ and $F_8$ to data format conversion means 8, data storage means 9 and data transmission means 10. As shown, symbol decoding means 7 provides symbol character data $D_3$ to data format conversion means 8 to convert data $D_3$ into two differently formatted types of symbol character data, namely $D_4$ and $D_5$. Format-converted symbol character date $D_4$ is of the "packed data" format, particularly adapted for efficient storage in data storage means 9. Format-converted symbol character data $D_5$ is particularly adapted for data transmission to a Data Storage Device such as CMOS memory 144 in remote unit 110. When symbol character data $D_4$ is to be converted into the format of the users choice based on a selected option mode, third control means 13 generates and provides enable signal $E_6$ to data storage means 9, as shown in FIG. 4. Similarly, when format converted data $D_5$ is to be transmitted to CMOS memory 144, the third control means 13 generates and provides enable signal $E_8$ to data transmission means 10.

which thereupon transmits format-converted symbol character data $D_5$ to CMOS memory 144, by way of cable 108.

In the illustrated embodiment, third control means 13, symbol decoding means 7, and data format conversion means 8 and data storage means 9 are realized using a single programmable device, such as microprocessor 63 having accessible memory and external timing means. In this way, conventional symbol decoding and data format conversion processing can be implemented in a straightforward manner. As for programming microprocessor 63 to realize third control means 13 and the control functions which it performs in the illustrative embodiment, reference is made to FIG. 4, 5, 6, 7A and 7B in particular. In order to illustrate the nature of this programming and how it can be realized starting from a high level flow chart, System-Control Operation No. 2, illustrated in FIGS. 10A and 10B, will be used as an example.

In FIG. 9A, the third control means is shown implemented with a timer 64 and microprocessor 63, whose input pins $I_1$ through $I_4$ and output pins $O_1$ through $O_8$ are utilized in achieving the control functions performed during System-Control Operation No. 2. In order to illustrate the programmed operation of the third control means during System-Control Operation No. 2, reference is made to FIGS. 9A and 9B of the drawings.

Figure 10A:
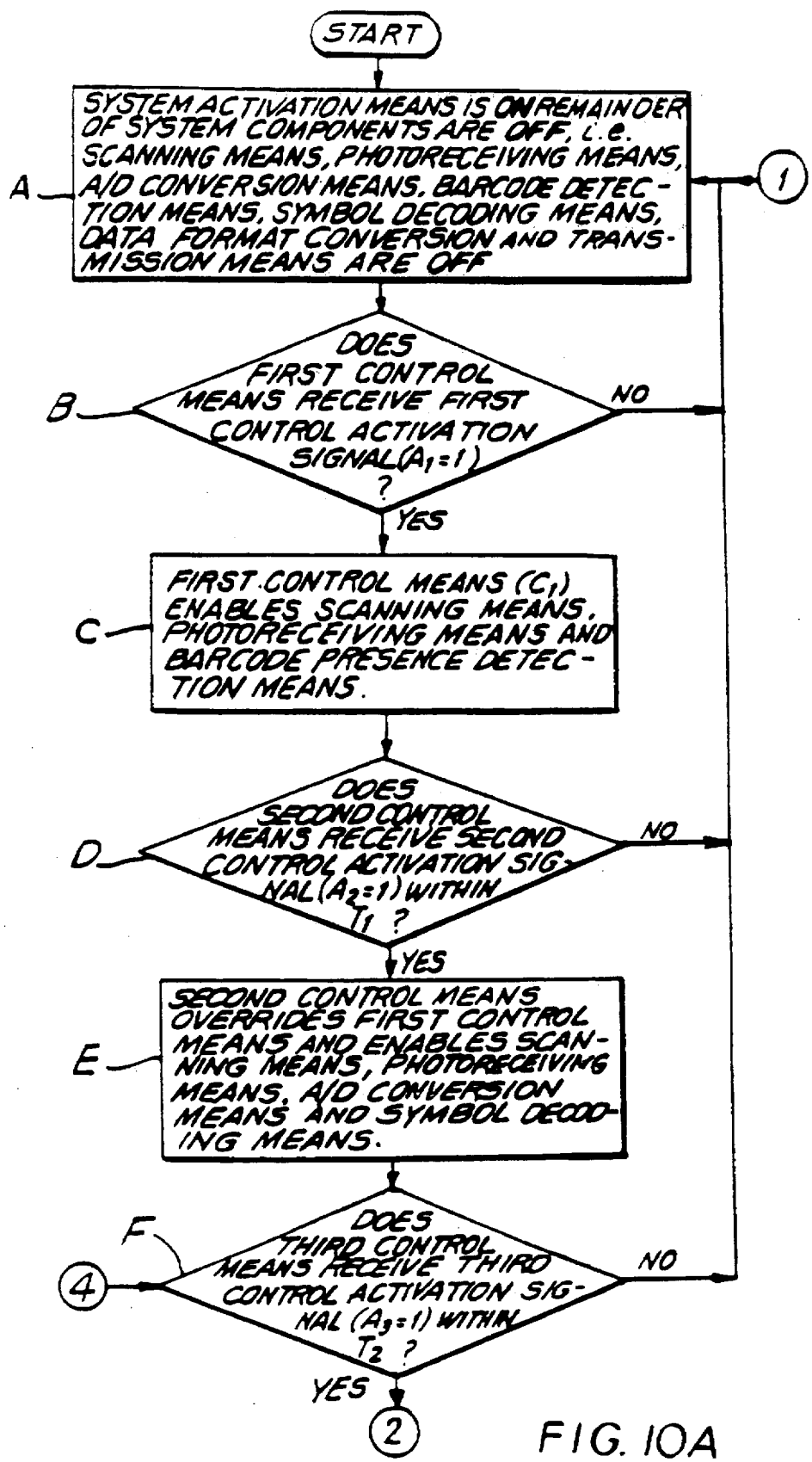
FIGS. 10A, 10B and 10C, taken together, show a high level flow chart illustrating three user-selectable courses of programmed system operation that the control system of the illustrative embodiment may undergo.
Figure 10B:
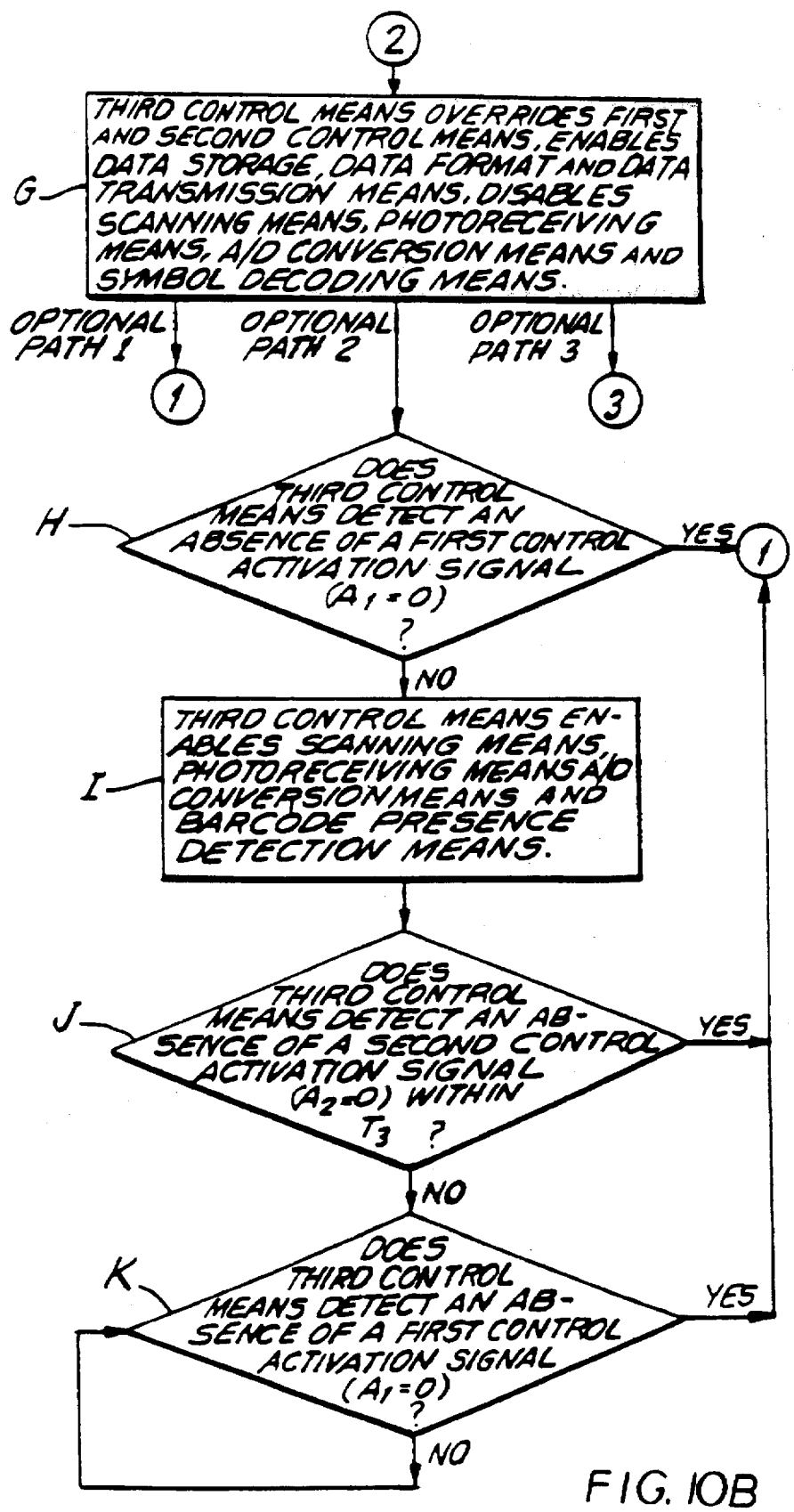

In FIG. 9A, the output of timer 64 is provided to input pin $I_4$ of microprocessor 63, whereas outputs $O_7$ and $O_8$ thereof are provided as start and reset signals respectively, to timer 64 as shown. Timer 64 is selected to elapse at $T_3$, which preferably will be about 2-3 seconds. Notably, each input $I_1$ through $I_4$, output $O_1$ through $O_8$, control activation signals $A_1$ through $A_1$, and enable signal $E_1$ through $E_8$, may take on either a logical "high" value (i.e., 1), or a logical "low" value (i.e., 0). As illustrated in FIGS. 10A and 10B, during progression through System-Control Operation No. 2, the presence of third control activation signal $A_3$ (i.e., $A_3=1$) activates third control means 13. The presence of such signal value at the third control means indicates a valid bar code symbol has been decoded by symbol decoder 7. At the point of activation of third control means 13, the possible logical operations that may occur therewithin (illustrated in flow chart of FIG. 9B), are dependent upon the condition of the first and second control activation signals $A_1$ and $A_2$ and the input $I_4$ from the output timer 64.

As illustrated in FIG. 9B, if control activation signals $A_3$ input at 13 is "low" (i.e., $A_3=0$), then the control program of the third control means returns to "start" and once again continuously senses for the presence of third control activation signal (i.e., $A_3=1$). Otherwise, if third control activation signal $A_3$ input at $I_3$ is high (i.e., $A_3=1$), then the control program outputs $O_2$, $O_3$ and $O_7$ as high, inhibiting first and second control means 11 and 12, and starting timer ($T_3$) 64, while toggling outputs $O_5$ and $O_6$ to enable data format conversion means 8 and data storage means 9 or data transmission means 10.

Then, the control program proceeds to determine whether the first control activation signal $A_1$ at input $I_1$ is absent (i.e., $A_1=0$), indicative of no object in scan field; if so, then the control program resets outputs $O_2$ and $O_3$ to return control to the inhibited first and second control means, while toggling output $O_8$, to reset timer ($T_3$) 64. Otherwise, if input $I_1$ is high, indicative of an object in the scan field, then the control program outputs $O_1$ as high, enabling third control means 13 to override first control means 11, while enabling scanning means 3 photoreceiving means 4 and bar code presence detection circuit 5.

The control program then determines whether second control activation signal $A_2$ at input 12 is low (i.e., $A_2=0$), indicative of there being no bar code present in the scan field; if so, the program resets outputs $O_2$ and $O_3$ to return control to the first and second control means, while toggling output $O_8$ to reset timer ($T_3$) 64 Otherwise, if second control activation signal $A_2$ at $I_2$ is high (i.e., $A_2=1$) indicative of a bar code present in the scan field, then the control program progresses to determine whether the output of timer 64 at input $I_4$ has gone low, indicative of timer $T_3$ elapsing (i.e., $t>T_3$). In this event, the control program resets output $O_1$ to disable scanning means 3, photoreceiving means 4 and bar code detection means 5. If the input at $I_1$ is not low (i.e., $A_1=1$) indicative of timer 64 not yet elapsed, then the control program continues to determine whether the input at $I_2$ has gone low ($A_2=0$), indicative that a bar code symbol is no longer in the scan field. The control program will continue to repeat the above-described decision loop until either the bar code symbol disappears from the scan field or timer 64 elapses, whichever occurs first. If after timer 64 has elapsed and output $O_1$ has been reset, then the control program finally enters a last decision loop, to determine if first control activation signal $A_1$ at input $I_1$ has gone low, indicative that an object is no longer in the scan field. If it has, then the control program returns to start, as indicated in FIG. 9B. Otherwise, until input $I_1$ goes low, indicating that an object no longer remains in the scan field, the control program will continue to progress through this decision loop.

Figure 10C:
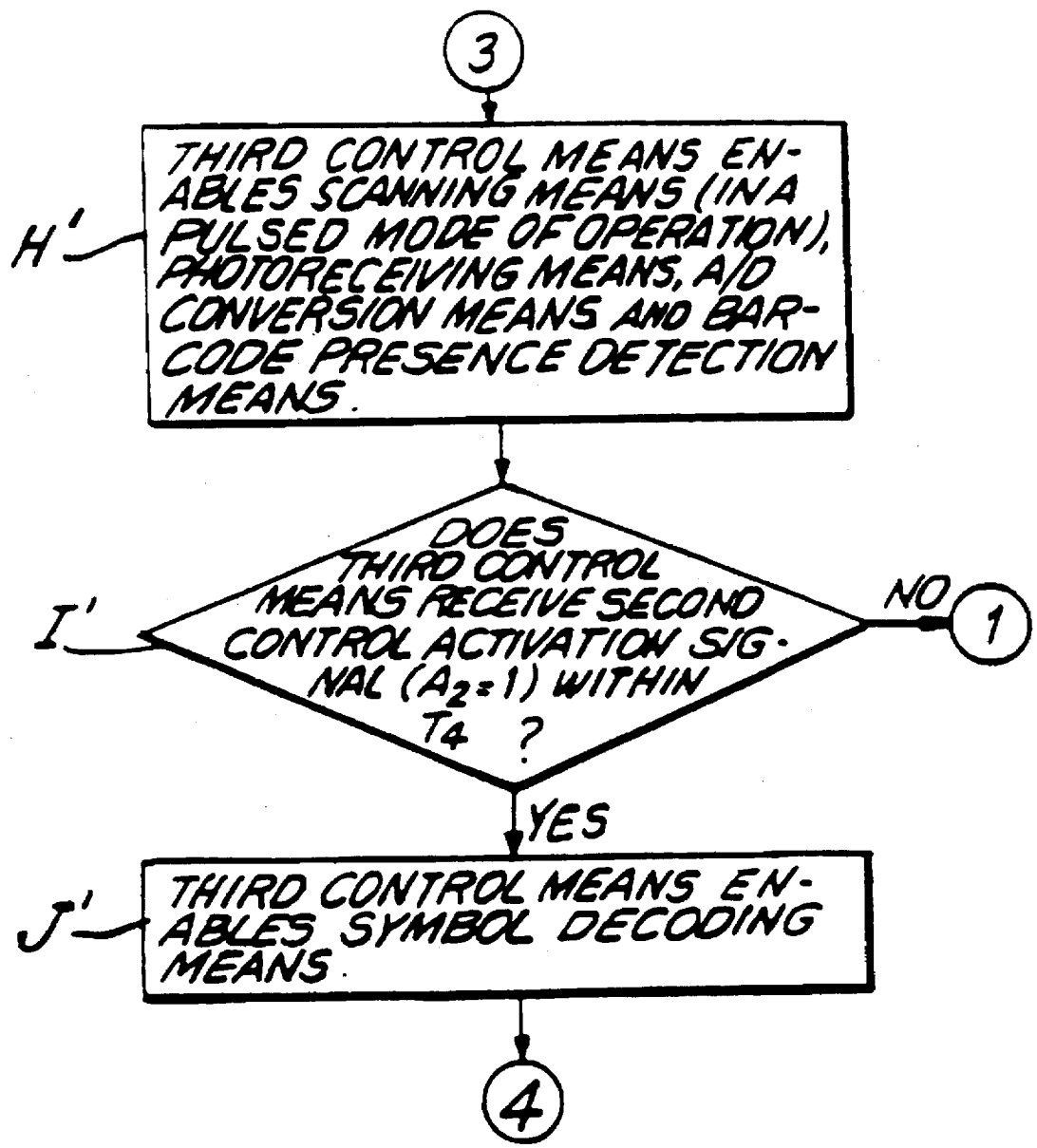

Notably, using the high level flow charts of FIGS. 10A and 8C, a control program for the third control means 13 can be implemented in a straightforward manner for System-Control Operation No. 3, illustrated in FIGS. 10B and 10C.

Having described the detailed structure and internal functions of the automatic bar code symbol reading system hereof, it is now proper at this juncture to describe the operation of its control (sub)system, for each of the three illustrated user-selectable System-Control Operations Nos. 1, 2, and 3.

Referring to Blocks A to G in FIGS. 10A and 10B, Systems-Control Operation No. 1 is illustrated. Beginning at Block A, the bar code symbol reading system is turned ON or powered-up, which results in system activation means 2 being enabled (i.e., ON), while the remainder of the systems components (i.e., scanning means 3, photoreceiving means 4, A/D conversion means 6, bar code symbol detection circuit 5, symbol decoding means 7, data format conversion means 8, data storage means 9 and data transmission means 10), being disabled (i.e., OFF). At Block B, the control system then determines whether first control means 11 detects the presence of first control activation signal (i.e., $A_1=1$). If not, then the control system returns to Block A; otherwise, if so, then as illustrated at Block C, first control means 11 directly enables scanning means 3, photoreceiving means 4 and bar code presence detection circuit 5.

Then at Block D, second control means 12 detects the presence of second control activation signal (i.e., $A_2=1$) within first predetermined time period $T_1$. If $A_2=1$ is not present, then the control system returns to Block A; and if so, then as indicated at Block E, second control means 12 overrides first control means 11 and indirectly enables scanning means 3, photoreceiving means 4, A/D conversion means 6, and symbol decoding means 7.

At Block F, third control means 13 then detect the presence of third control activation signal (i.e., $A_3=1$) within second predetermined time period $T_2$. If $A_3=1$ is not present within $T_2$, then the control system returns to Block A; and if so, then as indicated at Block G, third control means 13 overrides first and second control means 11 and 12, and indirectly enables data format conversion means 8, and data storage means 9 or data transmission means 10 until these functions are achieved, and therewhile disables scanning means 3, photoreceiving means 4, A/D conversion means 6 and symbol decoding means 7. Thereafter, as shown in FIGS. 10A and 10B, the control system returns to Block A, where only system activation means 2 is enabled Referring to Blocks A through K in FIGS. 10A and 10B, System-Control (override) Operation No. 2 is illustrated. This system-control operation offers the advantage of being able to avoid multiple reading of bar code symbols due to the scanning beam dwelling on a bar code symbol for an extended period of time.

Essentially, System-Control Operation No. 2 comprises but the last return operation of above-described System-Control Operation No. 1 and those additional operations represented Blocks G through K. After leaving Block G, third control means 13 detects the absence of first control activation signal (i.e., $A_1=0$); and if absent, then the control system returns to Block A. If first control activation signal $A_1$ is not absent but rather present (i.e., $A_1=1$), then third control means 13 indirectly enables through overridden first control means 11, scanning means 3 and the photoreceiving means 4, and through overridden second control means 12 indirectly enables A/D conversion means 6 and bar code presence detection circuit 5. Thereafter, at Block J, third control means 13 detects the absence of second control activation signal (i.e., $A_2=0$) within predetermined time period $T_3$. If signal $A_2$ is absent, then the control system returns to Block A; and if signal $A_2$ is present (i.e., $A_2=1$), then third control means 13 enters a decision loop at block K. Here, third control means 13 in its override mode continually detects the absence of the first activation signal (i.e. $A_1=0$), at which time the control system returns to Block A. Referring to Blocks A through G and H'through J'in FIGS. 10A, 10B and 10C, System-Control Operation No. 3 is illustrated. This system-control operation offers the advantage of being able to simply read bar code symbols in inventory applications, while conserving battery power.

Essentially, System-Control Operation No. 3 comprises all but the last return operation of above-described System-Control Operation No. 1 and those additional operations represented by Blocks H' through J'. After leaving Block G, third control means 13 enables, through overridden first control means 11, scanning means 3 in a pulsed mode of operation (by providing a pulsed enable signal $E_1'$ to laser driver 37). At Block H', third control means 13 also enables through overridden first control means 11, photoreceiving means 3, and through overridden second control means 12, enables bar code presence detection circuit 5, and A/D conversion means 6.

Thereafter at Block I', third control means 13 detects the presence of second control activation means (i.e., $A_2=1$) within a fourth predetermined time period $T_4$, determined using an internal timer similar to timer ($T_3$) 64 in FIG. 9A. Preferably, the time duration of $T_3$ is selected to be about 5–10 seconds. If signal $A_2$ is not present but rather absent (i.e., $A_2=0$), then the control system returns to Block A. Otherwise, if signal $A_2$ is present, then third control means 13 enables, through overridden second control means 12, symbol decoding means 7. Thereafter, the control system returns to Block F, shown in FIG. 10A.

Having described the operation of the control subsystem of the bar code symbol reading system of present invention, it can also be helpful to understand the various states that system may be in during the course of each particular system-control operation described above. In this regard, reference is made to FIG. 11 which provides a state diagram for the three system-control operations of the illustrated embodiment.

Figure 11:
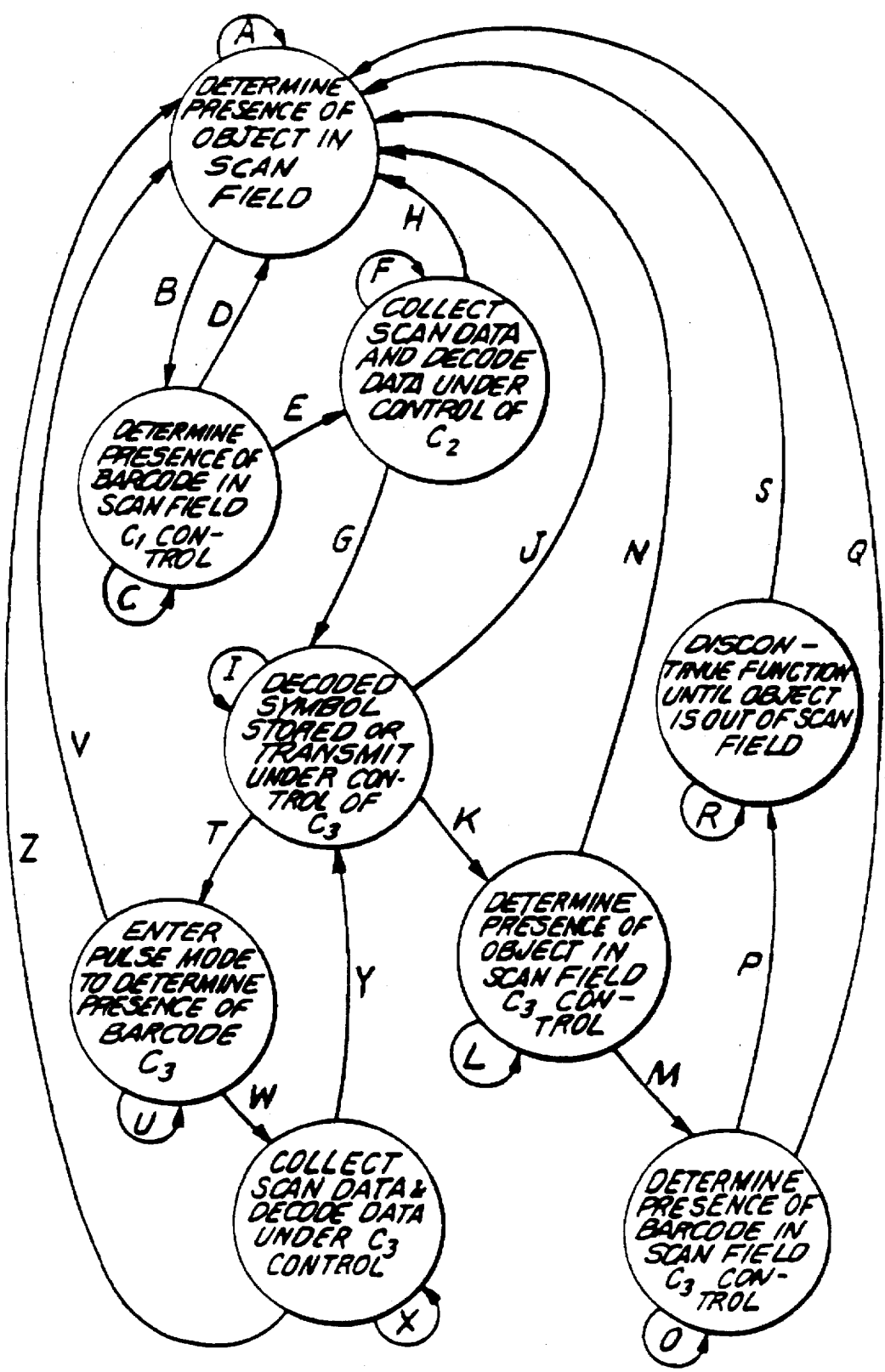
FIG. 11 is a state diagram illustrating the various states that the bar code symbol reading system of the illustrative embodiment may undergo during the course of its operation.

System-Control Operation No. 1 selected at option path 1, will be considered first. As illustrated in FIG. 11 when bar code symbol reading system is turned ON, only system activation means 2 is operative and all other system components are inoperative. This condition is indicated by State A, in which the device seeks to determine whether an object is in the scan field. Upon determination of the presence of an object in the scan field, the system will undergo State Transition B, placing the system in State C.

In State C, the device seeks to determine within line $T_1$ the presence of a bar code in scan field, while under the control of first control means 11. If no bar code symbol is determined to present in the scan field with time period $T_1$ then the system will undergo state transition D, returning the device back to initial State A (indicated as "start" in FIG. 10A). On the other hand, if a bar code symbol is determined to be present in the scan field within time period $T_1$, then the system will undergo State Transition E, placing the system in State F.

In State F, the system collects bar code scan data $D_1$ under the control of second control means 12, converts scan data $D_1$ into scan data $D_2$ and decode processes this scan data, scan-line by scan-line, in an attempt to decode a valid bar code symbol within time period $T_2$. If a bar code symbol is not decoded within time period $T_2$, then the system undergoes state transition H, returning the device to initial State A. If on the other hand a valid bar code symbol is decoded within time period $T_2$, symbol character data $D_3$ produced, and then the system undergoes State Transition G, placing the system in "control-override" State I.

In State I, the system, while under control of the third control means, converts the data format of symbol character data $D_3$ into either data $D_4$ or $D_5$ depending on whether the converted symbol character data is to be stored or transmitted to CMOS memory 144. Also in State I, the system either stores data $D_5$ in storage means 9, or transmits data $D_5$ to CMOS memory 144 via data transmission means 10 and cable 108, shown in FIG. 4. After completion of the above functions, the system undergoes State Transition J (due to user-selection of System-Control Operation No. 1), returning the system to initial State A, completing a full path through System-Control Operation No. 1.

System-Control Operation No. 2, selected at option path 2, will now be considered. From control override State I, the system undergoes transition K, due to user-selection of System-Control Operation No. 2, placing the system in control-override State L. In State L, the system determines the presence of an object in the scan field, while under the override control of third control means 13. Upon determination of the presence of an object in the scan field, the system undergoes State Transition M, placing it into State O. On the other hand, if no object is determined to be within the scan field, then the system returns to initial State A.

In State O, the system seeks to determine the presence of a bar code symbol within the scan field, while the system is under the control of third control means 13. If the system determines that no bar code symbol is within the scan field, then the system undergoes State Transition Q, returning the system to initial State A. If on the other hand the system determines that a bar code symbol lies within the scan field, indicative of the scanning beam dwelling on a bar code symbol for an extended period of time, then the system undergoes State Transition P, placing the system in control-override State R.

In State R, the system discontinues scanning, photoreceiving and bar code presence detection functions under the control of third control means 13, and continues to sense the presence of the object in the scan field until the object is removed therefrom. When the presence of the object is no longer detected within the scan field, then the system undergoes State Transition S, returning the system to initial State A.

Lastly, System-Control Operation No. 3, selected at option path 3, is now considered. From control-override State I, the system undergoes State Transition T, due to user-selection of System-Control Operation No. 3, placing the system in control-override State U. In State U, scanning means 3 is enabled in a pulsed-mode of operation under control of third control 13, photoreceiving means 4 and bar code presence detection circuit 5 are also enabled under third control means 13, and therewhile the system seeks to detect the presence of a bar code symbol in the scan field within fourth predetermined time period $T_4$. If a bar code symbol is not detected within time period $T_4$, then the system undergoes State Transition V and returns to initial State A under override control of third control means 13. If on the other hand, the presence of a bar code symbol is detected within time period $T_4$, then the system undergoes State Transition W, placing the system in control-override State X.

In State X, bar code scan data is collected scan-line by scan-line, and each scan line of data is decode processed in order to decode a valid bar code symbol. If a bar code symbol is decoded within time period $T_2$, then symbol character data $D_3$ is produced and the device undergoes State Transition Y, placing system in control-override State I under the control of third control means 13. There, symbol character data $D_3$ is format converted, and stored or transmitted as hereinbefore described. Thereafter, the bar code symbol reading system returns to State U under control of the third control means. If, however, a bar code symbol is not decoded within time period $T_2$, then the system undergoes state transition Z, returning the system to State A while under the control of third control means 13.

While the system of the present invention has been provided with three user-selectable system-control (i.e., intelligence) operations, additional system-control operations may be provided to the control system hereof, in a manner as discussed hereinabove.

Thus, in accordance with the present invention, an infrared transmitter is powered at all times while the laser scanning engine is turned off, and an infrared receiver and associated control circuitry automatically detect the presence of an object within the scan field of the laser scanning engine. The infrared receiver, upon detecting reflected energy from the object, activates control circuitry which activates the laser scanning beam, the laser scanner, the laser receiver and the signal processing circuitry of the laser scanning engine. The control system circuitry of the present invention is used to automatically control the programmed activation and deactivation of the processing and decoding circuitry in remote unit. In order to operate the laser scanning engine, all the user needs to do is bring the laser scanning engine close to an object bearing a symbol to be read, and automatically transmitted infrared energy is reflected back from the object and detected so as to activate the laser scanning engine and enabling the reading of the symbol.

Advantageously, the laser scanning engine and remote unit of the present invention require only a very low level of power in the non-scanning state, resulting in considerable power savings when a battery is used to provide completely portable operations. This enhances the utility of the system of the present invention by eliminating requirement for any hand-operated trigger mechanism or switch for the reading of bar code symbols.

Figure 12:
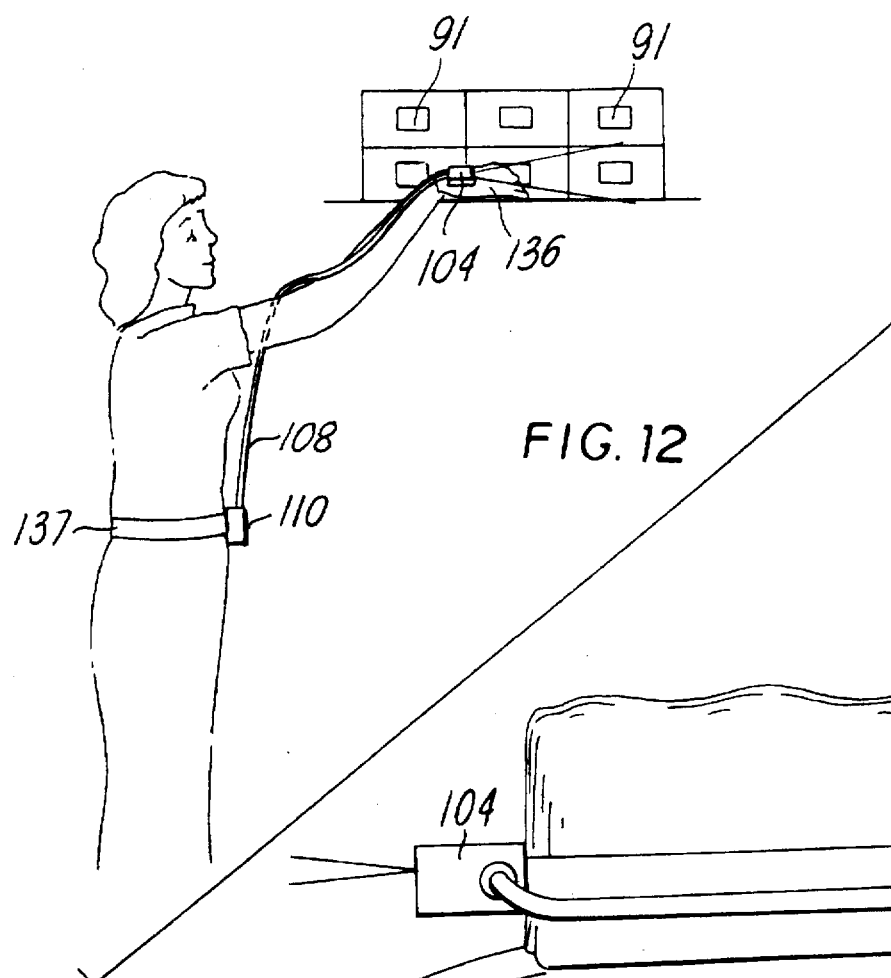
FIG. 12 is a side elevational view of the automatic bar code symbol reading system of FIG. 1, showing the laser scanning engine affixed to a glove worn on the user's hand, with the remote unit held in a holster or on a belt worn on the waist of the user.

In FIG. 12, there is shown an alternative application the system of the present invention. In that application, an inventory clerk is shown using the system for inventory control. To that end, the laser scanning engine 104 is shown mounted on a glove 136. With this arrangement, the clerk wearing the glove can scan labels affixed to bins or produces in inventory with both hands being free to handle the inventory items. The remote unit 110 may be mounted in the same manner as that described with reference to FIG. 3.

The bar code symbol reading system of the present invention can also be used for "picking" applications, where, for example, a stock clerk is assigned to retrieve a series of items held in inventory. In such applications, the remote unit 110 preferably includes memory 144, as indicated in FIGS. 1 and 4, into which information identifying the items to be retrieved by the clerk can be entered and stored. An annunciator (not shown) is included in the remote unit 110 and coupled to its decoder circuitry so that when a clerk scans an item and that item is decoded and matches the code of an item stored in memory 144, an alarm or alert signal is produced to indicate such an occurrence.

Figure 13:
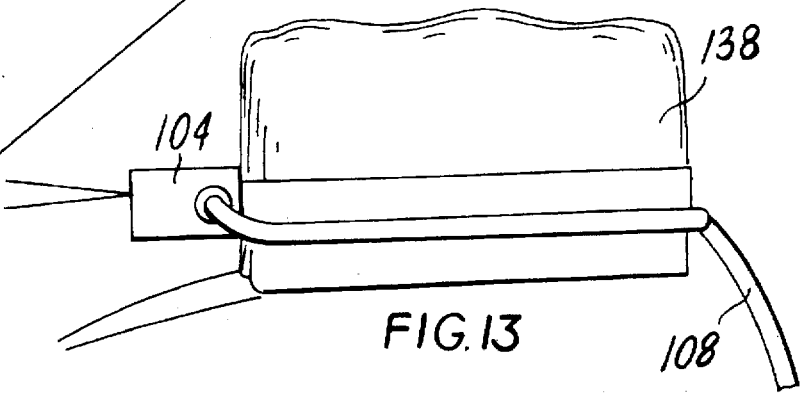
FIG. 13 is an elevational view of the automatic bar code symbol reading system of FIG. 1, showing the laser engine mounted on a hat worn on the user's head.
Figure 14:
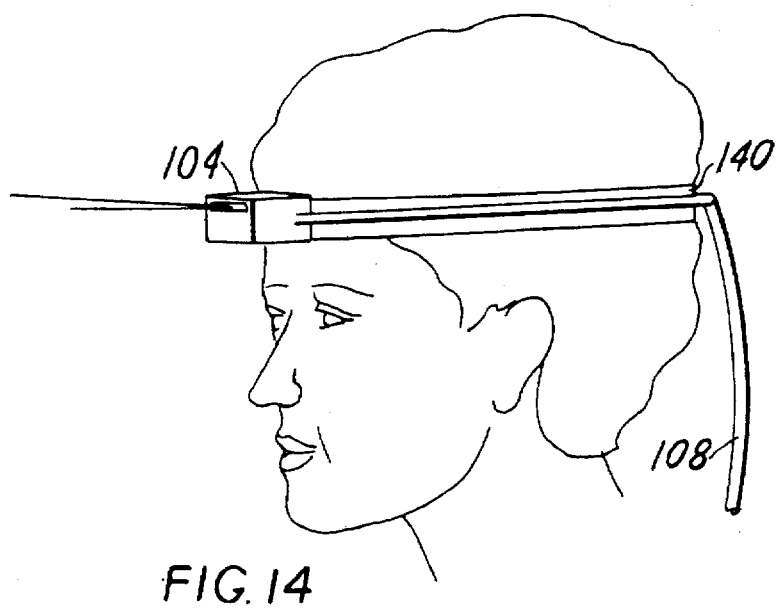
FIG. 14 is an elevational view of the automatic bar code symbol reading system of FIG. 1, showing the laser engine mounted on a headband worn on the user's head.

Several alternative ways of mounting the laser scanning engine 104 for hands-free operations are shown in FIGS. 13 and 14. For example, as shown in FIG. 13, laser scanning engine 104 is mounted on a hat 138 worn on the user's head in a manner similar to the mounting of a light on a miner's helmet. FIG. 14 shows laser scanning engine 104 mounted on a headband 140 similar to the conventional headband used by a doctor to mount a light or a reflector thereon. One advantage of the mounting system of FIG. 14 is that when the user moves his or her head to see the symbol to be read, the laser scanning pattern 114 is also directed to the symbol to be read, thereby providing a somewhat automatic aiming technique.

Without further elaboration, the foregoing will so fully illustrate the present invention that others may, by applying current or future knowledge, adapt the same for use under various conditions of service. All such adaptations and modifications of the same shall fall within the scope and spirit of the present invention defined by the appended claims to Invention.

What is claimed is:

1. A body-wearable laser scanning system having a programmed mode of automatic code symbol reading for consecutively reading code symbols without system reactivation, said body-wearable laser scanning system comprising:

housing support means wearable on the arm of an operator;

a housing having a light transmission aperture through which visible light can exit and enter said housing, and being operably connected to said housing support means so that said light transmission aperture is orientable in a scanning direction;

system activation means in said housing, for generating an activation signal for use in activating one or more components of said body-wearable scanning system;

activatable scan data producing means in said housing for producing, when activated, scan data from an object located in at least a portion of a scan field definable external to said housing, said activatable scan data producing means including
- a laser beam producing means for producing a laser beam within said housing and projecting said laser beam through said light transmission aperture, and scanning said laser beam across said scan field and a code symbol on said object, and
- laser light detecting means for detecting the intensity of laser light reflected off said code symbol and passing through said light transmission aperture, and automatically producing scan data indicative of said detected light intensity;

activatable scan data processing means for processing, when activated, produced scan data so as to detect and decode said scanned code symbol and automatically produce symbol character data representative of said decoded code symbol;

system control means for automatically activating said activatable scan data producing means and said activatable scan data processing means in response to the generation of said activation signal, and controlling the operation thereof during said programmed mode of automatic code symbol reading such that two or more code symbols on one or more objects in said scan field can be consecutively detected and decoded without reactivation of said activatable scan data processing means or said activatable scan data processing means; and battery power supply means, supportable on the body of said operator, for supplying electrical power to said system activation means, said activatable scan data producing means, said activatable scan data processing means, and said system control means.

2. The body-wearable laser scanning system of claim 1, wherein said code symbol is a bar code symbol, and wherein said bar code symbol has first and second envelope borders, and said activatable scan data processing means detects said bar code symbol by detecting said first and second envelope borders.

3. The body-wearable laser scanning system of claim 1, wherein said system activation means comprises
- signal transmitting means for transmitting a signal into said scan field, and
- signal receiving means for receiving said transmitted signal reflected off said object in at least a portion of said scan field, and automatically generating said activation signal in response to receiving said transmitted signal.

4. The body-wearable laser scanning system of claim 3, wherein said signal transmitting means comprises an infra-red light source for transmitting a pulsed infra-red light signal, and wherein said signal receiving means comprises an infra-red light detector and an optical element for focusing reflected infra-red light pulses onto said infra-red light detector.

5. The body-wearable laser scanning system of claim 1, wherein said housing support means comprises a glove wearable about the hand of said operator.

6. The body-wearable laser scanning system of claim 5, wherein said glove allows the finger of said operator to be exposed when worn about the hand thereof.

7. The body-wearable laser scanning system of claim 1, wherein said laser beam producing means comprises a laser diode for producing a visible laser beam.

8. The body-wearable laser scanning system of claim 1, wherein said scanning direction is oriented along the pointing direction of the fingers of said operator.

9. The body-wearable laser scanning system of claim 1, which further comprises a remote unit containing said activatable scan data processing means, said system control means and said battery power supply means.

10. The body-wearable laser scanning system of claim 1, which further comprises a radio frequency signal transmission means in said remote housing, for transmitting symbol character data to a peripheral device by way of radio frequency signal transmission.

11. The body-wearable laser scanning system of claim 1, wherein said housing support means is wearable on the back of the hand of the operator.

* * * * *

UNITED STATES PATENT AND TRADEMARK OFFICE
CERTIFICATE OF CORRECTION

PATENT NO.  : 5,742,043
DATED       : April 21, 1998
INVENTOR(S) : Carl Harry Knowles, George B. Rockstein, David M. Wilz, Sr., David P. Bubnoski It is certified that error appears in the above-indentified patent and that said Letters Patent is hereby corrected as shown below:

In the title on Page 1, and on column 1, line 1, change "BODY-NEARABLE" to --BODY WEARABLE--.

Signed and Sealed this

Eighteenth Day of August, 1998

Attest:

BRUCE LEHMAN

*Attesting Officer*     *Commissioner of Patents and Trademarks*